United States Patent
Regau

(10) Patent No.: US 9,883,565 B2
(45) Date of Patent: Jan. 30, 2018

(54) METHOD FOR OPERATING AN OPTOELECTRONIC ASSEMBLY AND OPTOELECTRONIC ASSEMBLY

(71) Applicant: OSRAM OLED GmbH, Regensburg (DE)

(72) Inventor: Kilian Regau, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 15/328,914

(22) PCT Filed: Jul. 17, 2015

(86) PCT No.: PCT/EP2015/066415
§ 371 (c)(1),
(2) Date: Jan. 25, 2017

(87) PCT Pub. No.: WO2016/030083
PCT Pub. Date: Mar. 3, 2016

(65) Prior Publication Data
US 2017/0215248 A1    Jul. 27, 2017

(30) Foreign Application Priority Data

Aug. 26, 2014  (DE) .......................... 10 2014 112 176

(51) Int. Cl.
*H05B 33/08*  (2006.01)
*B60Q 1/26*  (2006.01)
(Continued)

(52) U.S. Cl.
CPC ....... *H05B 33/0893* (2013.01); *H05B 33/083* (2013.01); *H05B 33/0851* (2013.01);
(Continued)

(58) Field of Classification Search
None
See application file for complete search history.

(56) References Cited

U.S. PATENT DOCUMENTS

2005/0237211 A1   10/2005  Sato et al.
2006/0170287 A1    8/2006  Ito et al.
(Continued)

FOREIGN PATENT DOCUMENTS

CN        102180124 A       9/2011
DE    102010003506 A1      10/2010
(Continued)

OTHER PUBLICATIONS

German Office Action based on application No. 10 2014 112 175.9 (5 pages) dated May 26, 2017 (Reference Purpose Only).
(Continued)

*Primary Examiner* — Jany Richardson
(74) *Attorney, Agent, or Firm* — Viering, Jentschura & Partner mbB

(57) ABSTRACT

A method for operating an optoelectronic assembly which includes at least one component string having at least one section, wherein the section includes at least one light emitting diode element, is provided. According to the method, the component string is supplied with electrical energy, the supply of the component string with electrical energy is interrupted, a total voltage is detected, which is present between an input and an output of the section of the component string, the total voltage is compared with a sum of threshold voltages of all the light emitting diode elements. It is identified that the section has no short circuit if the total voltage is equal or at least approximately equal to the sum of the threshold voltages, and/or it is identified that the section has a short circuit if the total voltage is less than the sum of the threshold voltages.

15 Claims, 10 Drawing Sheets

(51) Int. Cl.
    *B60Q 1/34*      (2006.01)
    *B60Q 11/00*     (2006.01)
(52) U.S. Cl.
    CPC .............. *B60Q 1/2696* (2013.01); *B60Q 1/34* (2013.01); *B60Q 11/007* (2013.01); *H05B 33/0824* (2013.01)

(56) References Cited

U.S. PATENT DOCUMENTS

| | | | |
|---|---|---|---|
| 2009/0009088 | A1 | 1/2009 | Ito et al. |
| 2011/0169496 | A1 | 7/2011 | Fried |
| 2011/0204792 | A1 | 8/2011 | Siegmund |
| 2012/0098430 | A1 | 4/2012 | Inoue et al. |
| 2013/0049599 | A1 | 2/2013 | Logiudice |
| 2013/0119861 | A1 | 5/2013 | Vollmer |
| 2014/0132273 | A1* | 5/2014 | Iwakiri .............. H05B 33/0815 324/414 |
| 2014/0139227 | A1* | 5/2014 | Iwakiri .............. H05B 33/0815 324/414 |

FOREIGN PATENT DOCUMENTS

| | | |
|---|---|---|
| DE | 102009055048 A1 | 6/2011 |
| DE | 102012107882 A1 | 2/2013 |
| JP | H02287492 A | 11/1990 |
| JP | 2006210219 A | 8/2006 |
| JP | 2013186946 A | 9/2013 |
| JP | 2013536571 A | 9/2013 |
| KR | 1020080106234 A | 12/2008 |
| KR | 1020140070289 A | 6/2014 |
| WO | 2007096868 A1 | 8/2007 |
| WO | 2010046811 A1 | 4/2010 |
| WO | 2010060458 A1 | 6/2010 |
| WO | 2011050421 A1 | 5/2011 |
| WO | 2011073096 A1 | 6/2011 |
| WO | 2012004720 A2 | 1/2012 |

OTHER PUBLICATIONS

German Office Action based on application No. 10 2014 112 176.7 (6 pages) dated May 26, 2017 (Reference Purpose Only).
German Search Report based on application No. 10 2014 112 175.9 (7 pages) dated May 4, 2015 (for reference purpose only).
International Search Report based on application No. PCT/EP2015/069459 (4 pages) dated Feb. 22, 2016 and English Translation (3 pages) (Reference Purpose Only).
German Search Report based on application No. 10 2014 112 176.7 (7 pages) dated May 4, 2015 (for reference purpose only).
International Search Report based on application No. PCT/EP2015/066415 (3 pages) dated Nov. 18, 2015 and English Translation (2 pages) (Reference Purpose Only).
Korean Office Action based on application No. 10-2016-7035536 (5 pages and 6 pages of English tarnslation) dated Sep. 28, 2017.
Chinese Office Action based on application No. 201580038209.X (4 pages and 7 pages of English translation) dated Nov. 16, 2017 (Reference Purpose Only).

* cited by examiner

Prior Art

Prior Art

Prior Art

| | No Short | | | Short | | | | |
|---|---|---|---|---|---|---|---|---|
| n | U | Uges | Uges/n | U | Uges | Uges/(n-1) | VGL1 | VGL2 |
| 7 | 41,1 | 30 | 4,29 | 37,92 | 25,6 | 4,27 | -14,7% | -8% |
| 6 | 35,18 | 25,6 | 4,27 | 31,92 | 21,7 | 4,34 | -15,2% | -9% |
| 5 | 29,18 | 21,7 | 4,34 | 25,78 | 17,5 | 4,38 | -19,4% | -12% |
| 4 | 23,17 | 17 | 4,25 | 19,71 | 13 | 4,33 | -23,5% | -15% |

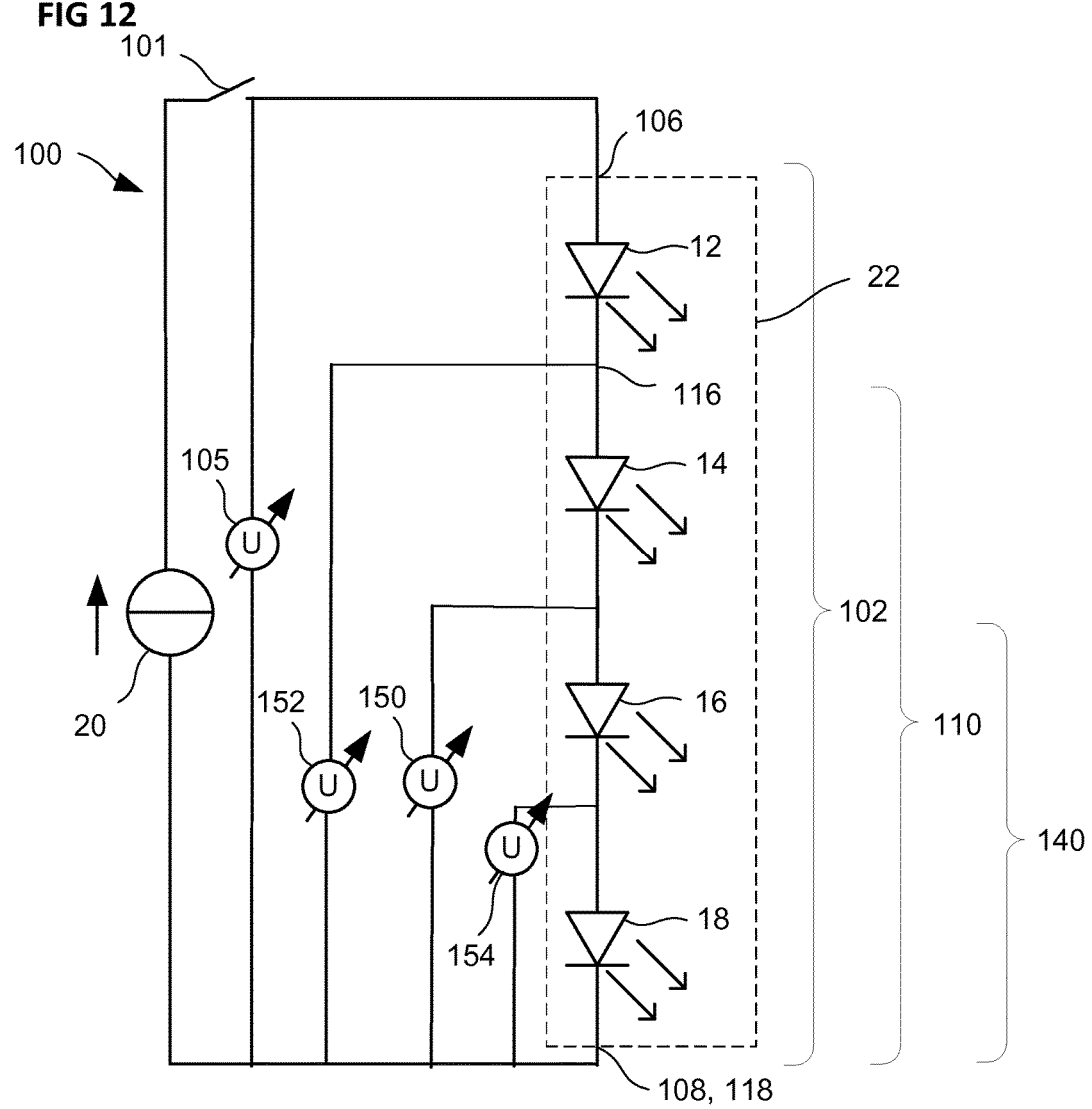

METHOD FOR OPERATING AN OPTOELECTRONIC ASSEMBLY AND OPTOELECTRONIC ASSEMBLY

RELATED APPLICATIONS

The present application is a national stage entry according to 35 U.S.C. §371 of PCT application No.: PCT/EP2015/066415 filed on Jul. 17, 2015, which claims priority from German application No.: 10 2014 112 176.7 filed on Aug. 26, 2014, and is incorporated herein by reference in its entirety.

TECHNICAL FIELD

Various embodiments relate to a method for operating an optoelectronic assembly and to an optoelectronic assembly.

BACKGROUND

An optoelectronic assembly may include for example one, two or more light emitting diode elements. The light emitting diode elements can be for example light emitting diodes (LEDs) and/or organic light emitting diodes (OLEDs) or parts or segments of light emitting diodes (LEDs) and/or organic light emitting diodes (OLEDs).

Despite elaborate quality control procedures for light emitting diode elements, the situation in which the light emitting diode elements fail spontaneously in use cannot be completely ruled out. In the case of an OLED, for example, a typical fault pattern for a spontaneous failure is a short circuit (referred to as short) between the electrodes of the corresponding light emitting diode element. Such a short circuit is generally over a small area. A large part of the total current is thus concentrated at the short-circuit point having a small area. Consequently, the current density is significantly boosted at the short-circuit point, as a result of which said short-circuit point can heat up greatly depending on its areal extent. This can lead to the melting of the electrodes, to dark spots in the luminous image of the OLED, to a completely dark OLED and/or to a location becoming hot on the OLED.

In order to prevent a potential hazard as a result of this overheating (combustion hazard, fire, rupture, etc.), such a short circuit should be identified by driver electronics of the optoelectronic assembly and a suitable protective reaction should be initiated (switching off of the OLED or of the optoelectronic assembly, bypassing of the supply current around the short-circuited OLED, outputting of a warning signal, etc.). In the automotive sector, for example, it is demanded that defective OLEDs or LEDs, for example in rear lights, be electronically identified and at least reported to the on-board system.

A customary interconnection of light emitting diode elements, for example OLEDs, of an optoelectronic assembly in use is, for technical reasons and for cost reasons, the series connection of the light emitting diode elements. By way of example, a plurality of light emitting diode elements in a light emitting diode can be electrically connected in series and/or a plurality of light emitting diodes can be electrically connected in series. In many applications, for example in the automotive sector or in the field of general lighting, a plurality of light emitting diode elements are thus electrically connected in series. If individual defective light emitting diode elements in a series connection are intended to be identified using simple methods, this constitutes a particular challenge.

U.S. Pat. No. 2,011,204 792 A1, W0 2010 060 458 A1 and W0 2012 004 720 A2 disclose methods for determining short circuits of individual OLEDs in which an overvoltage or undervoltage at the corresponding OLED is used as a criterion for a defect. The over- or undervoltages are detected during the normal operation of the OLEDs. As a reaction to the identification of the short circuit, the methods implement bypassing of the drive current and/or fault signal generation.

FIG. 1 shows a conventional optoelectronic assembly 10 including a first light emitting diode element 12, a second light emitting diode element 14, a third light emitting diode element 16 and a fourth light emitting diode element 18. The light emitting diode elements 12, 14, 16, 18 are arranged in a component string 22 of the optoelectronic assembly 10. The second light emitting diode element 14 has a short circuit, depicted as short-circuit resistance 24 in FIG. 1. The short-circuit resistance 24 is electrically connected in parallel with the second light emitting diode element 14 and behaves electrically similarly to an ohmic resistance, wherein the value of the resistance can vary depending on the type of short circuit.

With a measurement of the forward voltage in accordance with the conventional methods for determining the short circuit in the case of the optoelectronic assembly 10 illustrated in FIG. 1, the following problems arise if individual measurement is not carried out at each light emitting diode element 12, 14, 16, 18: The resistance value (R_Short) of the short-circuit resistance 24, for example in the case of an OLED, is in a wide range, for example of between 10 ohms and a number of kohms. With one input of the component string 22 and one output of the component string 22, only a total voltage (Uges) across all the light emitting diode elements 12, 14, 16, 18 can be detected during nominal operation. Given identical light emitting diode elements 12, 14, 16, 18, the total voltage thus corresponds to four times corresponding individual voltages (Uf) of the light emitting diode elements 12, 14, 16, 18 and, without a short circuit, results as $$\text{Uges} = 4 \times Uf.$$

If the short circuit is present in the case of one of the light emitting diode elements 12, 14, 16, 18, then the following results:

$$\text{Uges} = 3 \times Uf + R\_\text{Short} \times I.$$

Given an individual voltage of Uf=6V, a nominal operating current (I) of 300 mA and a short circuit having a resistance value of 10 ohms, the total voltage results as $$\text{Uges} = 3 \times 6 \text{ V} + 10 \text{ ohms} \times 0.3 \text{ A} = 21 \text{ V}.$$

If the identification threshold (U_T) for the short circuit in the case of one of the light emitting diode elements 12, 14, 16, 18 is set to a value between three and four times the individual voltage, e.g. three and a half times the individual voltage, then the identification threshold results as $$U\_T = 3.5 \times 6 \text{ V} = 21 \text{ V}.$$

Consequently, the total voltage in the case of a fault in this example is exactly at the identification threshold, which does not yield sufficient identification certainty in the case of variations of the corresponding measurement values that occur in reality.

However, if the short circuit has a higher resistance value of 50 ohms, for example, then the total voltage results as $$\text{Uges} = 3 \times 6 \text{ V} + 4.8 \text{ V} = 22.8 \text{ V},$$

for which reason the short circuit with the above identification threshold U_T=21 V is not identified as such. This can stem from the fact that a corresponding short circuit can have a higher resistance than the organic system of the short-circuited OLED. The individual voltage of the corresponding OLED is thus principally determined by the organic system and not by the short circuit. Nevertheless, the current density is increased at the short-circuit point, which leads to the temperature increase, for which reason there should be a reaction to the short circuit.

In the case of a plurality of light emitting diode elements 12, 14, 16, 18 in a component string 22, the reduction of the total voltage by a short circuit goes down as a percentage, in particular in the case of long string lengths, or is partly canceled out by the voltage drop at the short circuit and is thus tolerance-susceptible. A short-circuit signature present in the case of the total voltage is identifiable with difficulty or not at all.

The problems thus arise that, in the case of a short circuit, the individual voltage across the short-circuited light emitting diode element 12, 14, 16, 18, owing to the voltage drop at the short circuit during nominal operation, does not necessarily drop significantly compared with a light emitting diode element 12, 14, 16, 18 without a short circuit, and that in principle it cannot be identified whether the total voltage is normal or lower than normal owing to a short circuit.

Therefore, it is known to provide just one light emitting diode element per driver circuit, that is to say no series connection, or dedicated detection electronics are fitted at each light emitting diode element or, at each OLED connection point, voltage measuring lines have to be led to the driver control electronics, which means an increased wiring outlay. These approaches are expensive and complex. In order to measure the individual forward voltages, therefore, either a measuring system has to be connected to each OLED, which requires a high wiring outlay and a high number of measuring systems and thus causes high costs, or a single measuring system has to be switched through to the individual OLEDs in each case, for example by means of multiplexing, which however likewise requires a high wiring outlay and outlay for multiplexing and thus causes high costs.

Systems are known, however, in which, in a manner governed by the design, each light emitting diode element is individually contacted with a transistor for switching the light emitting diode element and corresponding control lines to the transistors are present, for example for a dimming and/or a flashing system.

FIG. 2 shows a conventional optoelectronic assembly 10 that largely corresponds to the conventional assembly 10 explained above. The optoelectronic assembly 10 can be for example from the automotive sector, for example a direction indicator of a motor vehicle, for example an animated flashing indicator. The light emitting diode elements 12, 14, 16, 18 are intended to be driven individually with constant current. For cost reasons, the light emitting diode elements 12, 14, 16, 18 are electrically connected in series and only one driver circuit 20 is used, for example a rapidly regulating current source, for example a DC-DC converter. Each light emitting diode element 12, 14, 16, 18 is electrically connected in parallel with respectively a switch, for example a first transistor 32, a second transistor 34, a third transistor 36 and a fourth transistor 36. The current can thus be conducted individually past each light emitting diode element 12, 14, 16, 18 and nevertheless through the other light emitting diode elements 12, 14, 16, 18. For the purpose of dimming, the transistors 32, 34, 36, 38 can also be driven in a pulse-width-modulated manner.

In the case of the conventional optoelectronic assembly shown in FIG. 2, the individual forward voltages can be measured relatively simply compared with FIG. 1. A measuring system can be connected which detects the total voltage, and apart from one switch all the other switches can be closed successively, such that all the light emitting diode elements apart from one are bridged, and then the forward voltage of the individual light emitting diode element can be detected by means of the measuring system. However, here, too, the corresponding light emitting diode element is measured during operation and, as explained above, a drop in the forward voltage is not reliably identifiable depending on the short-circuit resistance.

In many applications, in order to reduce costs and wiring outlay, a plurality of OLEDs are connected in series, as shown in FIGS. 1 and 2, and operated with current regulation by a single driver channel. In such applications, the known methods for identifying short circuits are not suitable, do not function sufficiently well or are usable only with increased technical outlay and/or outlay in terms of costs. Consequently, the conventional methods cannot reliably identify one or more short-circuited light emitting diode elements within a series connection or can reliably identify said element(s) only with high technical outlay.

SUMMARY

One object of the present disclosure is to provide a method for operating an optoelectronic assembly which makes it possible: to reliably identify a short circuit of an individual light emitting diode element of the optoelectronic assembly, to reliably identify a short circuit of a light emitting diode element in a series connection of light emitting diode elements of the optoelectronic assembly, to identify the short circuit with only one input and one output of a driver circuit of the optoelectronic assembly, and/or to minimize an interference variable influence of aging and/or temperature on the identification of the short circuit.

Another object of the present disclosure is to provide an optoelectronic assembly which makes it possible: to reliably identify a short circuit of an individual light emitting diode element of the optoelectronic assembly, to reliably identify a short circuit of a light emitting diode element in a series connection of light emitting diode elements of the optoelectronic assembly, to identify the short circuit with only one input and one output of a driver circuit of the optoelectronic assembly, and/or to minimize an interference variable influence of aging and/or temperature on the identification of the short circuit.

The objects are achieved in accordance with one aspect of various embodiments by means of a method for operating an optoelectronic assembly. The optoelectronic assembly includes at least one component string having at least one section. The section includes at least one light emitting diode element. The component string is supplied with electrical energy. The supply of the component string with energy is interrupted. A total voltage is detected, which is present between an input of the section of the component string and an output of the section of the component string. The total voltage is compared with a sum of predefined threshold voltages of all the light emitting diode elements of the section. It is identified that the section of the component string has no short circuit if the total voltage is equal or at least approximately equal to the sum of the predefined threshold voltages. Alternatively or additionally, it is identified that the section of the component string has a short circuit if the total voltage is less than the sum of the predefined threshold voltages.

Measuring the total voltage between the input and the output of the section of the component string, said section still being operated shortly beforehand, makes it possible to reliably identify even an individual short-circuited light emitting diode element, in particular in an electrical series connection, in the section. A driver circuit for operating, in particular for driving, for controlling and/or for regulating, the light emitting diode elements of the component string can be used for identifying the short circuit, in which case said driver circuit only has to have one input and one output. Depending on the embodiment, the influence of interference variables such as aging and temperature on the detection can be minimized/eliminated, as explained in greater detail further below, in which case possibly one, two or more further inputs and/or outputs have to be implemented for this purpose. The light emitting diode element is for example an OLED or an LED or a part or a segment of an OLED or LED.

The total voltage is measurable across the input and the output of the section. If the input of the section is electrically coupled to the input of the component string or corresponds thereto and if the output of the section is electrically coupled to the output of the component string or corresponds thereto, then the total voltage across the component string can be detected and corresponds to the total voltage across the section. The total voltage shortly after the interrupting of the supply of the component string with energy, in the case of a section without a short circuit, differs significantly from the total voltage of a section with a short circuit. The detected total voltage is independent of the resistance value of the short circuit. The fact that the short circuit is present in the section and/or the component string means that one of the light emitting diode elements in the corresponding section and/or component string has the short circuit.

As a reaction to the identification of the short circuit, for example, the driver circuit can switch off or be switched off, a warning signal can be generated and conducted to a superordinate unit, for example a computing unit, for example an on-board computer of a motor vehicle, and/or the short-circuited light emitting diode element can be electrically bypassed. This may be of interest for example in the automotive sector and/or in the field of general lighting, and/or in the consumer sector, for example in the case of a handheld luminaire having an individual OLED or a plurality of OLEDs.

In accordance with one development, the section includes a predefined number of light emitting diode elements. All the light emitting diode elements of the section have the same predefined threshold voltage. It is identified that the section has the short circuit if the detected total voltage is less than the sum of all the predefined threshold voltages by one predefined threshold voltage. This can contribute to identifying the short circuit in a simple manner.

In accordance with one development, the total voltage is detected only after a predefined time duration after the interrupting of the supply of the component string with energy. The predefined time duration can be in a range for example of 50 µs to 60 s, for example of 500 µs to 1 s, for example of 1 ms to 500 ms, for example of 10 ms to 100 ms. This can contribute to being able to precisely determine the total voltage and/or to reliably identifying the short circuit.

In accordance with one development, the method involves determining after what time duration after the interrupting of the supplying of the component string with energy a voltage across a light emitting diode element of the section of the component string corresponds to its predefined threshold voltage. The time duration thus determined is predefined as the predefined time duration. In other words, the total voltage is detected only when the respective electrical voltages across the light emitting diode elements of the section have dropped to the predefined threshold voltage thereof. The time duration can for example be empirically determined, stored and then predefined. This can contribute to being able to precisely determine the total voltage and/or to reliably identifying the short circuit.

In accordance with one development, the supply of the component string with energy is interrupted by a driver circuit for operating the component string being switched off or an electrical connection between the driver circuit and the component string being interrupted. This can contribute to interrupting the supply of the component string with energy reliably and/or in a simple manner. The driver circuit can be switched off for example by means of a computing unit for driving, regulating or operating the driver circuit. The electrical connection between the driver circuit and the component string can be interrupted for example by means of a corresponding switch.

In accordance with one development, firstly it is determined whether a first section of the component string that includes a first light emitting diode element has a short circuit by virtue of the fact that, after interrupting the supplying of the component string with energy, for example after the predefined time duration, an individual voltage is detected at the first light emitting diode element and the detected individual voltage is compared with the predefined threshold voltage of the first light emitting diode element. If the detected individual voltage is equal or at least approximately equal to the predefined threshold voltage, the detected individual voltage is predefined as a setpoint value. The first section of the component string and a second section of the component string, said second section being connected in series with the first section and including at least one second light emitting diode element, are supplied with energy. The supply of the component string with energy is interrupted again. The total voltage between the input of the first section and an output of the second section is detected. The detected total voltage is compared with a product of the predefined setpoint value and the number of light emitting diode elements in the component string. It is identified that the second section has a short circuit if the detected total voltage is less than the product. It is identified that the second section has no short circuit if the detected total voltage is equal or at least approximately equal to the product. If the first section includes only a single light emitting diode element, the individual voltage at the corresponding light emitting diode element corresponds to the total voltage at the corresponding section.

In other words, the method is carried out twice, firstly in the case of the first section, in particular the first light emitting diode element, and then in the case of the second section, in particular the other light emitting diode elements. If the first section includes exactly one light emitting diode element, namely the first light emitting diode element, then the presence of the short circuit in the first section can be identified in a simple manner if the total voltage is zero or approximately zero. If the short circuit is not present in the first light emitting diode element, then the detected individual voltage is not equal to zero and, if the light emitting diode element of the first section is similar or identical to the light emitting diode element(s) of the second section, said detected individual voltage can be used as a threshold voltage, as a reference value, and/or as a setpoint value, for further measurements, in particular in the second section. This can contribute to largely or even completely eliminating interfering influences, such as temperature and/or aging, on the identification of the short circuit, since the first light emitting diode element in the first section is generally subject to the same influences as the other light emitting diode elements in the second section, and since the interfering influences have therefore already affected the predefined setpoint value, that is to say the predefined threshold voltage, which was determined beforehand, and have thus been taken into account.

In accordance with one development, firstly it is determined whether a first section of the component string that includes at least one first light emitting diode element has a short circuit by virtue of the fact that, after interrupting the supplying of the component string with energy, for example after the predefined time duration, a first total voltage between an input of the first section of the component string and an output of the first section of the component string is detected, and the detected first total voltage is compared with a sum of the predefined threshold voltages of all the light emitting diode elements of the first section. The first section of the component string and a second section of the component string, said second section being connected in series with the first section and including at least one second light emitting diode element, are supplied with energy. The supply of the component string with energy is interrupted. A second total voltage between an input of the second section and an output of the second section is detected, and the detected second total voltage is compared with a sum of the threshold voltages of all the light emitting diode elements of the second section.

In other words, the method is carried out at least twice, firstly in the case of the first section and then in the case of the second section. Furthermore, the component string can be subdivided into further sections and the method can be carried out correspondingly more frequently. The shorter the section, the more pronounced the difference in the total voltage between a section having a short circuit and the same section without a short circuit. This can contribute to realizing a particularly high identification accuracy, wherein a fault tolerance is higher, and/or to largely eliminating interfering influences, such as temperature and/or aging, on the identification of the short circuit.

In accordance with one development, the first total voltage is compared with the second total voltage. The presence of the short circuit in one of the sections is identified depending on the comparison. This may be advantageous, for example, if both sections include the same number of light emitting diode elements. In the case of intact light emitting diode elements, the respective total voltages should then be equal or at least approximately equal. This comparison can serve for example as additional and/or redundant checking.

The objects are achieved in accordance with another aspect by means of an optoelectronic assembly. The optoelectronic assembly includes: at least one component string having at least one section, wherein the section includes at least one light emitting diode element, an energy source electrically coupled to the component string and serving for supplying the component string with electrical energy, a first switch for interrupting the supply of the component string with energy, a voltage measuring device for detecting a total voltage between an input of the section of the component string and an output of the section of the component string, an evaluation unit, which is configured to determine, depending on the detected total voltage, whether the section of the component string, in particular the light emitting diode element of the component string, has a short circuit by virtue of the fact that the total voltage is compared with the sum of threshold voltages of all the light emitting diode elements of the section and it is identified that the section of the component string has no short circuit if the total voltage is equal or at least approximately equal to the sum of the threshold voltages, and/or it is identified that the section of the component string has a short circuit if the total voltage is less than the sum of the threshold voltages.

The optoelectronic assembly is suitable for carrying out the method explained above. In particular, the supply of the component string with energy can be provided or interrupted by means of the first switch. The advantages and developments mentioned with respect to the method can readily be applied to corresponding advantages and developments of the optoelectronic assembly. The energy source can for example be the driver circuit, be designated as driver circuit or be a part of the driver circuit.

In accordance with one development, the first switch is designed such that the driver circuit for operating the component string can be switched on or switched off by means of the first switch or that an electrical connection between the driver circuit and the component string can be connected or interrupted.

In accordance with one development, the component string includes the first section and the second section, which is electrically connected in series with the first section. The first section includes at least the first light emitting diode element. The second section includes at least the second light emitting diode element. The optoelectronic assembly includes a second switch, which in its first switching state electrically couples an output of the first section to an output of the second section and which in its second switching state electrically isolates the output of the first section and the output of the second section from one another. The second switch makes it possible to check the first section independently of the second section with regard to the presence of the short circuit.

In accordance with one development, the optoelectronic assembly includes a third switch, which in its first switching state electrically couples the input of the first section to the input of the second section and which in its second switching state electrically isolates the input of the first section and the input of the second section from one another and which is electrically coupled to the second switch. The third switch makes it possible to examine the second section independently of the first section with regard to the short circuit.

In accordance with one development, at least one of the light emitting diode elements is an inorganic light emitting diode or a part of an inorganic light emitting diode, and a capacitor is electrically connected in parallel with the component string.

In accordance with one development, at least two of the light emitting diode elements are inorganic light emitting diodes, and a respective capacitor is electrically connected in parallel with the inorganic light emitting diodes.

The capacitor(s) make(s) it possible, in the case of the inorganic light emitting diodes, to carry out the method explained above and reliably identify the short circuit.

Since the electrodes of an inorganic light emitting diode are relatively small compared with an OLED, the capacitors provide for electronic conditions in the optoelectronic assembly which make it possible to carry out the method. In particular, after interrupting the supplying of the component string with energy, the total voltage corresponds to the sum of the voltages across the capacitors assigned to the intact light emitting diode elements, wherein, in the case of a short circuit, the capacitor of the corresponding light emitting diode element can discharge rapidly via the resistance. Alternatively or additionally, at least one of the light emitting diode elements is an organic light emitting diode or a segment of an organic light emitting diode.

In accordance with one development, at least one section of the component string includes at least two light emitting diode elements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 12 shows a circuit diagram of one embodiment of an optoelectronic assembly.

DETAILED DESCRIPTION

In the following detailed description, reference is made to the accompanying drawings, which form part of this description and show for illustration purposes specific embodiments in which the present disclosure can be implemented. In this regard, direction terminology such as, for instance, "at the top", "at the bottom", "at the front", "at the back", "front", "rear", etc. is used with respect to the orientation of the figure(s) described. Since component parts of embodiments can be positioned in a number of different orientations, the direction terminology serves for illustration and is not restrictive in any way whatsoever. It goes without saying that other embodiments can be used and structural or logical changes can be made, without departing from the scope of protection of the present disclosure. It goes without saying that the features of the various embodiments described herein can be combined with one another, unless specifically indicated otherwise. Therefore, the following detailed description should not be interpreted in a restrictive sense, and the scope of protection of the present disclosure is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

An optoelectronic assembly may include one, two or more light emitting diode elements. Optionally, an optoelectronic assembly can also include one, two or more electronic components. An electronic component may include for example an active and/or a passive component. An active electronic component may include for example a driver circuit, an energy source, a computing, control and/or regulating unit and/or a transistor. A passive electronic component may include for example a capacitor, a resistor, a diode or a coil.

A light emitting diode element can be an electromagnetic radiation emitting semiconductor light emitting diode element, an inorganic light emitting diode (LED) and/or an organic light emitting diode (OLED). However, a light emitting diode element can also be only a part or a segment of a light emitting diode, for example of an LED or of an OLED. By way of example, the OLED can be segmented and include a light emitting diode element in each segment. A plurality of light emitting diode elements in a light emitting diode can be electrically connected in parallel and/or electrically connected in series. A light emitting diode element can be part of an integrated circuit. Furthermore, a plurality of light emitting diode elements can be provided, for example in a manner accommodated in a common housing. A light emitting diode element can emit for example light in the visible range, UV light and/or infrared light.

Figure 1:
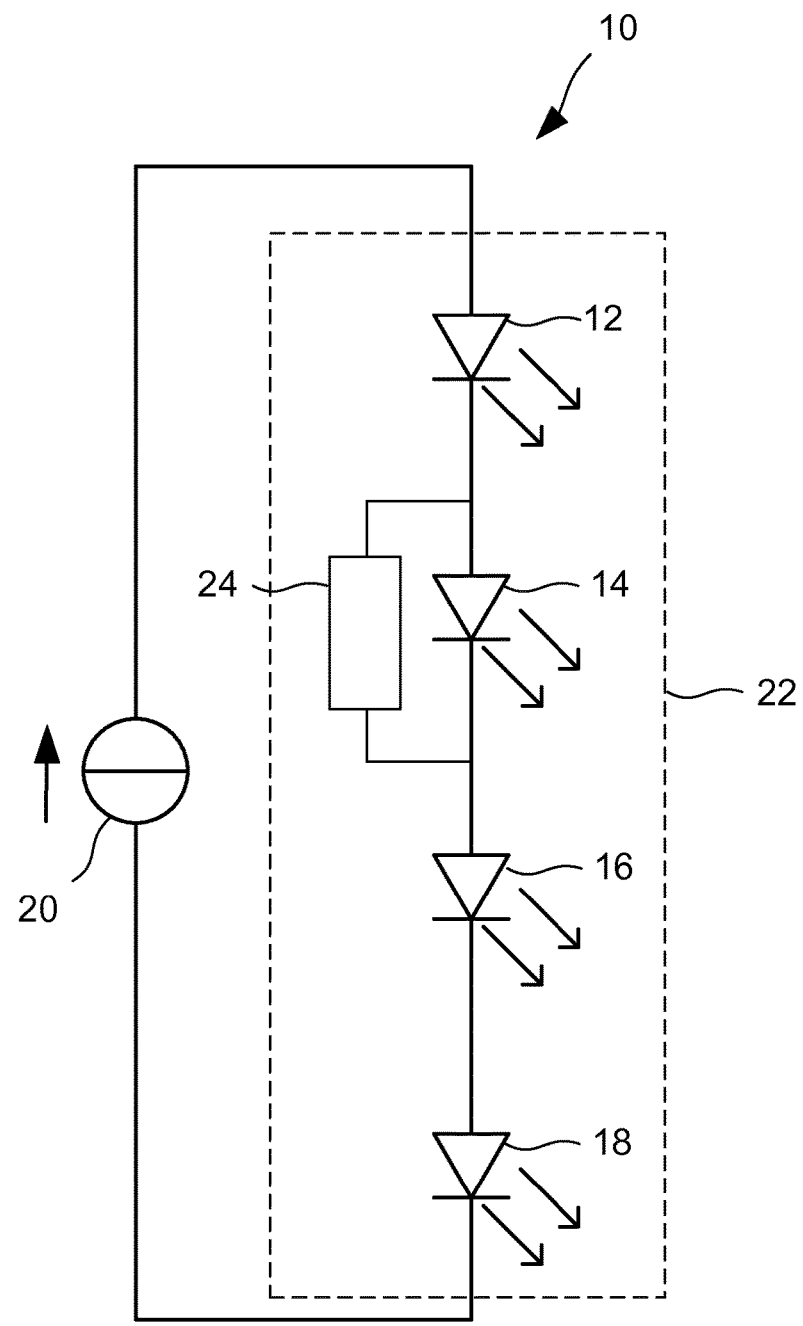
FIG. 1 shows a circuit diagram of a conventional optoelectronic assembly.

FIG. 1 shows a conventional optoelectronic assembly 10 including a first light emitting diode element 12, a second light emitting diode element 14, a third light emitting diode element 16 and a fourth light emitting diode element 18. The light emitting diode elements 12, 14, 16, 18 are arranged in a component string 22 of the assembly 10. The light emitting diode elements 12, 14, 16, 18 are electrically connected in series. A driver circuit 20 is arranged and serves for operating, in particular for controlling or regulating, the light emitting diode elements 12, 14, 16, 18.

The second light emitting diode element 14 has a short circuit, depicted as short-circuit resistance 24 in FIG. 1. The short-circuit resistance 24 is electrically connected in parallel with the second light emitting diode element 14 and behaves electrically similarly to an ohmic resistance. The value of the ohmic resistance depends on the nature of the short circuit, for example on an area of the short circuit.

Figure 2:
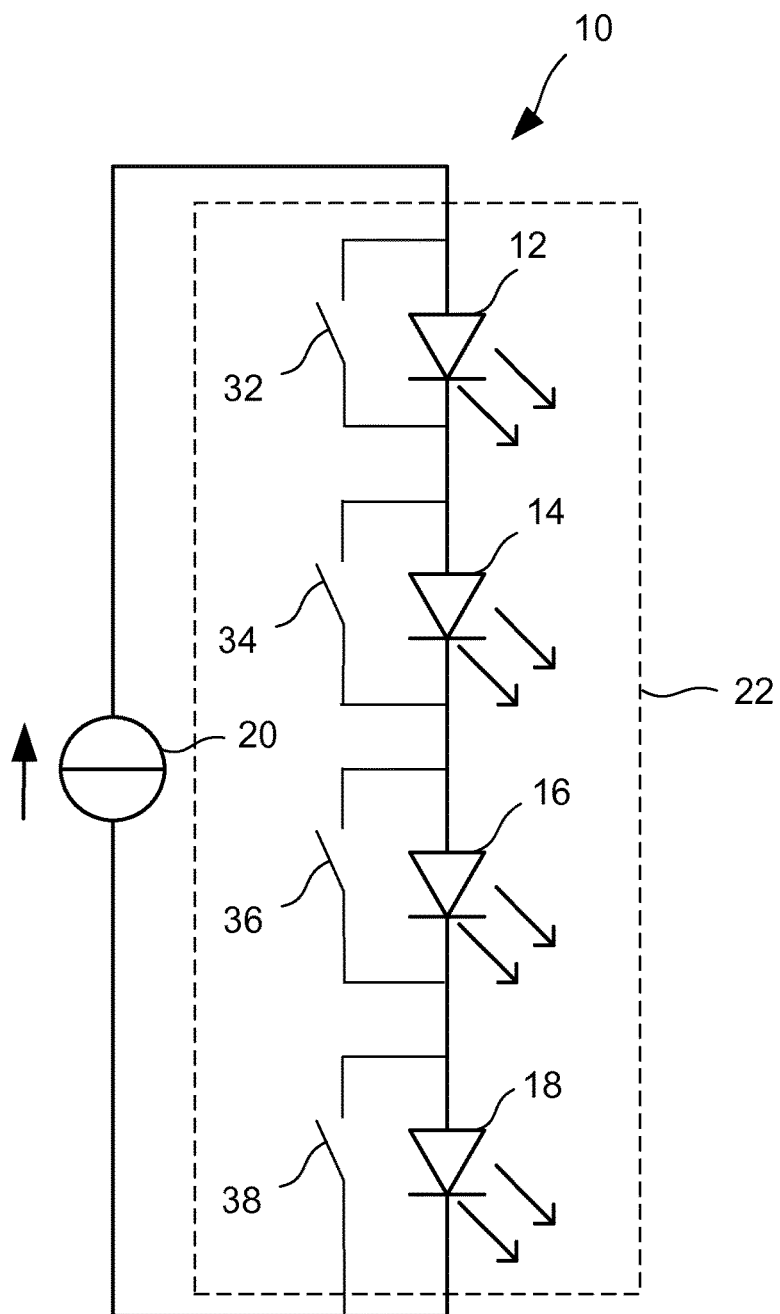
FIG. 2 shows a circuit diagram of a conventional optoelectronic assembly.

FIG. 2 shows a conventional optoelectronic assembly 10. The conventional optoelectronic assembly 10 can for example largely correspond to the conventional optoelectronic assembly 10 shown in FIG. 1. The light emitting diode elements 12, 14, 16, 18 are electrically connected in parallel with respectively a switch, for example a first transistor 32, a second transistor 34, a third transistor 36 and a fourth transistor 36. The current can thus be conducted individually past each light emitting diode element 12, 14, 16, 18 and nevertheless through the other light emitting diode elements 12, 14, 16, 18.

Figure 3:
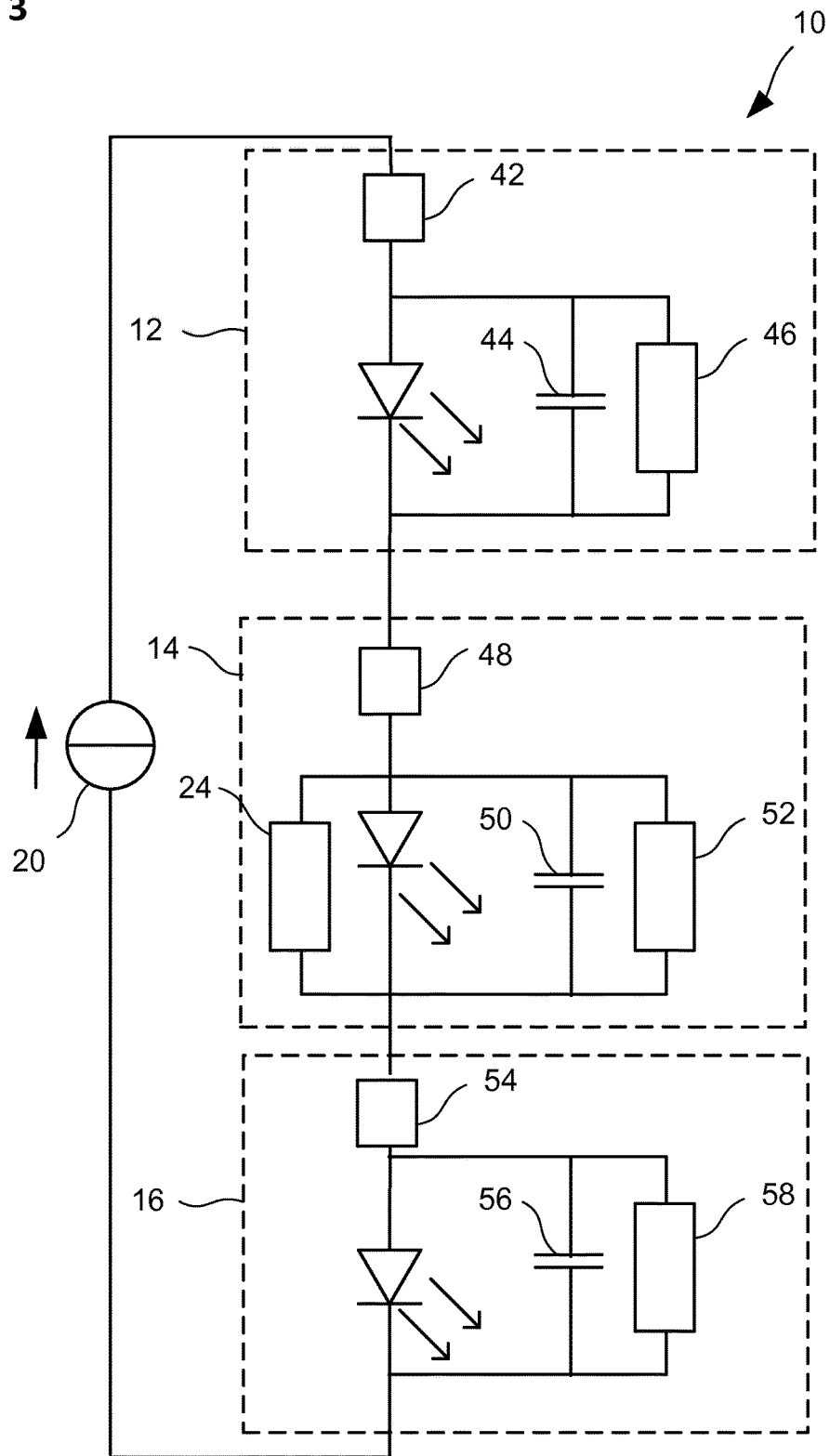
FIG. 3 shows a circuit diagram of a conventional optoelectronic assembly.

FIG. 3 shows a conventional optoelectronic assembly 10 that largely corresponds to the optoelectronic assembly 10 shown in FIG. 1, wherein the optoelectronic assembly 10 includes only three light emitting diode elements 12, 14, 16. The light emitting diode elements 12, 14, 16 are illustrated by means of equivalent circuit diagrams in FIG. 3. In the equivalent circuit diagrams, intrinsic capacitances 44, 50, 56 and electrode resistances 42, 48, 54 and bulk resistances 46, 52, 58 are depicted for each light emitting diode element 12, 14, 16. The bulk resistances 46, 52, 58 can also be designated as leakage current resistances. In other words, on account of their intrinsic properties, the light emitting diode elements 12, 14, 16 have capacitances and resistances, which are depicted as independent electronic components alongside the diode symbols in FIG. 3. In the equivalent circuit diagram, the diode symbols are merely representative of the light emitting layers of the light emitting diode elements 12, 14, 16. In each of the electrode resistances 42, 48, 54, different intrinsic parts can be combined, two or more intrinsic resistances; in particular, the individual resistances of the two electrodes of the first light emitting diode element 12 can be represented as a single electrode resistance 42.

FIG. 3 and, in particular, the equivalent circuit diagrams shown in FIG. 3 serve to afford a better understanding of the optoelectronic assemblies and methods for operating the corresponding optoelectronic assemblies explained with reference to the subsequent figures.

The first light emitting diode element 12 has a first electrode resistance 42, a first intrinsic capacitance, illustrated as first capacitor 44, and a first bulk resistance 46. The second light emitting diode element 14 has a second electrode resistance 48, a second intrinsic capacitance, illustrated as second capacitor 50, and a second bulk resistance 52. The third light emitting diode element 16 has a third electrode resistance 54, a third intrinsic capacitance, illustrated as third capacitor 56, and a third bulk resistance 58.

The light emitting diode elements 12, 14, 16 are OLEDs and the electrode resistances 42, 48, 54 are the ohmic resistances of the anodes, in particular of ITO layers, and/or cathodes of the OLEDs, which are illustrated with the aid of a common resistance symbol for reasons of clarity. The intrinsic capacitances correspond to the capacitors 44, 50, 56, which are formed by a respective anode-cathode pair of the OLEDs. The bulk resistances 46, 52, 58 correspond to the bulk resistances typical of diodes and enable very small leakage currents to flow via the light emitting diode elements 12, 14, 16.

As an alternative thereto, the light emitting diode elements 12, 14, 16 can also be LEDs, wherein the values of the resistances and/or of the capacitances can then be significantly lower than in the case of the OLEDs.

The second electrode resistance 48 is electrically connected in series with the short-circuit resistance 24. The short-circuit resistance 24 is electrically connected in parallel with the second capacitor 50 and the second bulk resistance 52.

The electronic properties of the conventional optoelectronic assembly 10, which are discernible with the aid of the equivalent circuit diagrams, are utilized hereinafter to provide an optoelectronic assembly and/or a method for operating an optoelectronic assembly in which a short circuit of one of the light emitting diode elements 12, 14, 16 can be identified simply and reliably.

Figure 4:
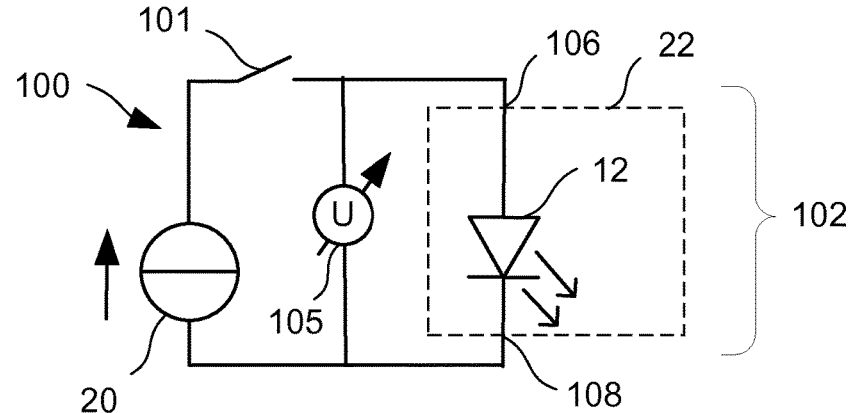
FIG. 4 shows a circuit diagram of one embodiment of an optoelectronic assembly.

FIG. 4 shows one embodiment of an optoelectronic assembly 100. The optoelectronic assembly 100 includes the component string 22 and the first light emitting diode element 12. The first light emitting diode element 12 has the intrinsic capacitance and the intrinsic electrode resistance, which are not shown in FIG. 4 for reasons of clarity.

The component string 22 includes a section 102, the first light emitting diode element 12 being arranged therein. The section 102 includes an input 106 of the section and an output 108 of the section 102. A first switch 101 is electrically coupled to the input 106 of the section 102 and to the driver circuit 20. The first switch 101 in its first switching state brings about an electrical coupling between the input 106 of the section 102 and the driver circuit 20, and is thus closed in its first switching state, and in its second switching state prevents said electrical coupling, and is thus open in its second switching state.

A voltage measuring device 105 is electrically connected in parallel with the component string. The voltage measuring device 105 serves, with the first switch 101 open and/or with the driver circuit switched off or not active, to detect the total voltage present at the component string 22, in particular the total voltage between the input 106 of the section 102 and the output 108 of the section 102.

In the case of the optoelectronic assembly 100, it is possible to check in a simple manner whether an electrical short circuit is present in the first light emitting diode element 12. In the case of an intact first light emitting diode element 12, that is to say if there is no short circuit present at the first light emitting diode element 12, after the supply of the component string 22 with electrical energy has been interrupted, the first light emitting diode element 12 discharges via the optically functional layer structure, in particular the layers that emit light during normal operation, of the first light emitting diode element 12 and the intrinsic bulk resistance of the light emitting diode element 12 initially just until only its threshold voltage is present at the first light emitting diode element 12, since the light emitting diode element 12 is still electrically conductive up to the threshold voltage. If the threshold voltage is reached, the intrinsic capacitance of the first capacitor 44 then discharges only very slowly via the bulk resistance. The threshold voltage can be detected as the total voltage after a short time duration after the opening of the first switch 101 by means of the voltage measuring device 105. The total voltage thus detected can then be compared with a predefined threshold value corresponding, in particular, to the predefined threshold voltage. If the detected total voltage corresponds or at least approximately corresponds to the predefined threshold value, then no short circuit is present. The predefined threshold voltage can be empirically determined and/or stored, for example.

If the short circuit is present at the first light emitting diode element 12, then the first light emitting diode element 12, in particular the intrinsic capacitance thereof, discharges very rapidly after the opening of the first switch 101 completely via the short circuit and there is no longer a difference in voltage between the input 106 and the output 108. The voltage measuring device 105 then detects only the value zero or approximately zero.

In order to check the first light emitting diode element 12 with regard to the short circuit, therefore, firstly the first switch 101 is switched into its first switching state, that is to say is closed. The component string 22 and, in particular, the first light emitting diode element 12 are supplied with electrical energy by means of the driver circuit 20. Next, the driver circuit 20 is switched off and/or the first switch 101 is opened, such that the supply of the component string 22 with electrical energy is interrupted. After the predefined time duration, the total voltage between the input 106 and the output 108 is detected. If the detected total voltage is zero or approximately equal to zero, then it is identified that a short circuit is present at the first light emitting diode element 12. If the total voltage corresponds to the predefined setpoint value or exceeds the latter, then it is identified that no short circuit is present at the light emitting diode element 12. The predefined setpoint value can be for example a minimum value or threshold value. The predefined setpoint value can be stored on a storage unit of an evaluation unit and/or computing unit for checking the optoelectronic assembly 100 with regard to the short circuit.

The predefined time duration can for example be determined empirically. By way of example, it is possible to determine after what time duration after the interrupting of the supplying of the component string 22 with energy the total voltage across the section 102 of the component string 22 corresponds to a sum of the threshold voltages of all the light emitting diode elements 12 of the section 102. The time duration thus determined can be predefined as the predefined time duration. In other words, the total voltage can be detected only when the respective voltages across the light emitting diode elements 12 of the section 102 have dropped to the predefined threshold voltages thereof. The predefined time duration can be in a range for example of 50 µs to 60 s, for example of 500 µs to 1 s, for example of 1 ms to 500 ms, for example of 10 ms to 100 ms. By way of example, a time duration of 500 µs to 5 ms will be possible in the case of pulsed operation (PWM operation) with a pulse frequency of approximately 200 Hz. In the case of a flashing indicator having a flashing indicator pause of 700 ms, for example, the predefined time duration would accordingly be less than 700 ms. However, longer time durations can also be predefined since the corresponding optoelectronic assembly 100 can also be checked with regard to the short circuit after the switching off of normal operation, for example of flashing indicator operation.

The above-explained method for operating the optoelectronic assembly 100 can be run through for example as a special test scenario, for example when switching off the driver circuit 20 and/or, in the automotive sector, when switching off the automobile luminaire including the optoelectronic assembly 100. Alternatively or additionally, the test method can be carried out once, repeatedly and/or regularly in one or more pulse pauses in the case of pulsed operation (PWM operation) of the optoelectronic assembly 100, for example if the latter is part of a flashing indicator of a motor vehicle.

Figure 5:
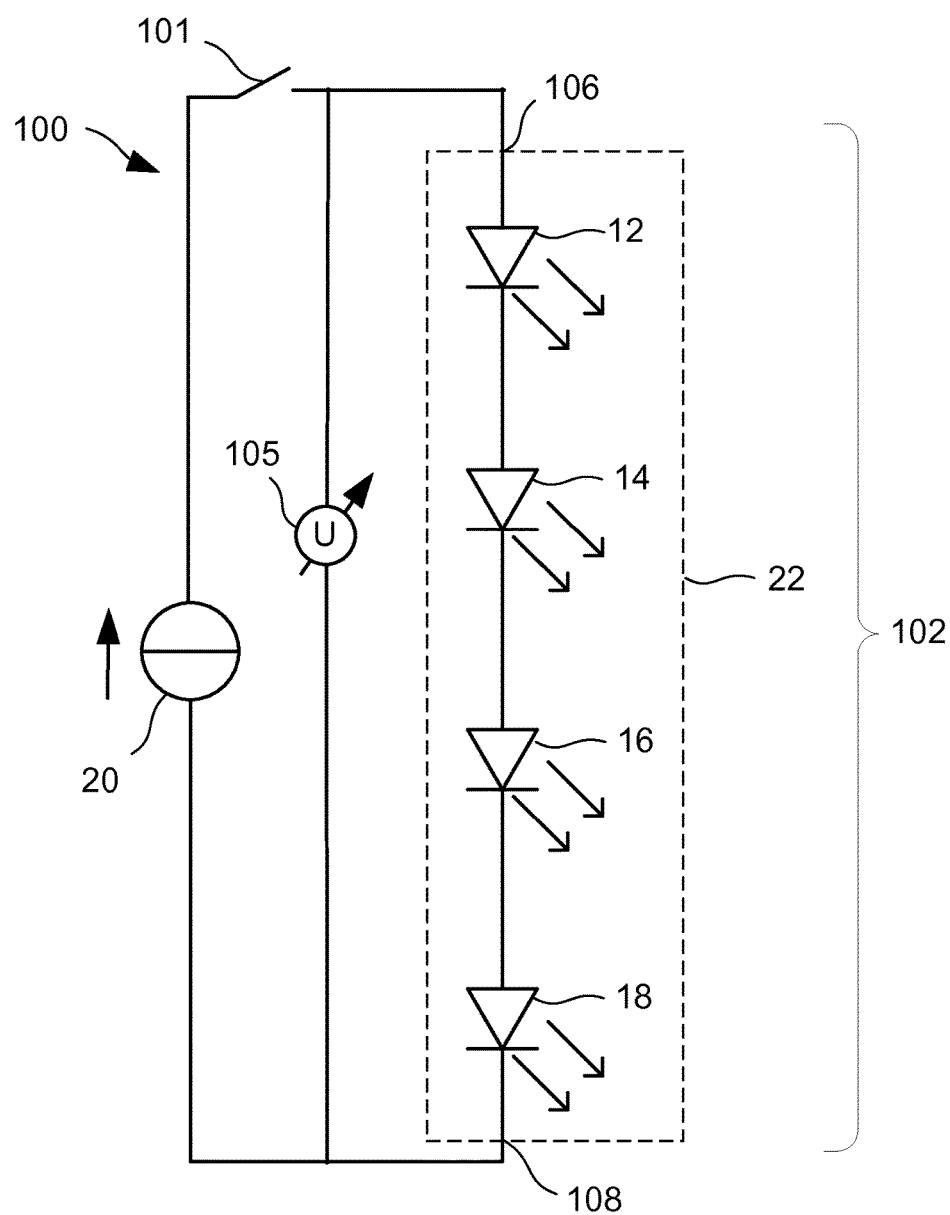
FIG. 5 shows a circuit diagram of one embodiment of an optoelectronic assembly.

FIG. 5 shows a circuit diagram of one embodiment of an optoelectronic assembly 100, which for example can largely correspond to the optoelectronic assembly 100 shown in FIG. 4. The optoelectronic assembly 100 includes four light emitting diode elements 12, 14, 16, 18, which are electrically connected in series in the component string 22 and the section 102.

If the light emitting diode elements 12, 14, 16, 18 have no short circuit, then they discharge after the interrupting of the supplying of the component string 22 with energy, in particular after the opening of the first switch 101, via their intrinsic bulk resistances and organic functional layer structures on account of their intrinsic capacitances to their predefined threshold voltages, wherein the individual predefined threshold voltages add up to form a total voltage across the component string 22. The total voltage thus corresponds to a sum of the individual voltages at the intrinsic capacitances. In the case of four light emitting diode elements 12, 14, 16, 18, the total voltage corresponds to four times the individual voltages. In other words, on account of the intrinsic capacitances, a residual amount of energy remains stored in the light emitting diode elements 12, 14, 16, 18, which is measurable as the total voltage by means of the voltage measuring device 105.

If the short circuit is present at one of the light emitting diode elements 12, 14, 16, 18, for example at the second light emitting diode element 14, then the energy stored in said second light emitting diode element 14 discharges via the short-circuit resistance 24 and the total voltage decreases by this one predefined threshold voltage. That is to say that, given the number of n light emitting diode elements 12, 14, 16, 18, the total voltage is less than in the case of exclusively intact light emitting diode elements 12, 14, 16, 18 by one threshold voltage. The deviation of the detected total voltage from the predefined setpoint value can be identified by means of a computing unit (not illustrated), for example an evaluation unit, which is coupled to the voltage measuring device 105 and/or the driver circuit 120. The predefined threshold voltage can be stored as a predefined setpoint value for example in the computing unit or the evaluation unit. Alternatively, the evaluation unit may include an analog comparator device, for example a comparator circuit, which compares the detected total voltage with a predefined setpoint voltage, for example a reference voltage, which represents the predefined setpoint value, and outputs a result value. Temperature influences on the maximum value of the discharge current can be eliminated or at least minimized by the checking with regard to the short circuit always being carried out at the same temperature, for example using a temperature sensor (not illustrated).

In the method, therefore, after the predefined time duration after the interrupting of the energy supply of the component string 22, the total voltage is measured at the section 102 to be examined of the component string 22. Said total voltage is significantly dependent on the number of intact, that is to say short-circuit-free, light emitting diode elements 12, 14, 16, 18 in the component string 22, in particular the section 102. In the case of a short circuit at one of the light emitting diode elements 12, 14, 16, 18, that is to say in the case of a number (n−1) of entirely satisfactory light emitting diode elements 12, 16, 18 and one short-circuited light emitting diode element 14, the short-circuited light emitting diode element 14 discharges very rapidly, in particular before the predefined time duration has elapsed, via the short-circuit resistance 24 by an individual voltage Uf corresponding, for example, to the threshold voltage of the corresponding light emitting diode element 12, 14, 16, 18. If a light emitting diode element 12, 14, 16, 18 having a short circuit is present, then the total voltage is lower by one individual voltage compared with the case of an entirely satisfactory component string 22 without a short-circuited light emitting diode element 12, 14, 16, 18. If two or more light emitting diode elements 12, 14, 16, 18 each having a short circuit are present, then the total voltage is lower by the corresponding individual voltages compared with the case of an entirely satisfactory component string 22 without short-circuited light emitting diode elements 12, 14, 16, 18.

Alternatively, the optoelectronic assembly 100 may include more than one component string 22, more than one section 102 and/or more or fewer light emitting diode elements 12, 14, 16, 18.

Figure 6:
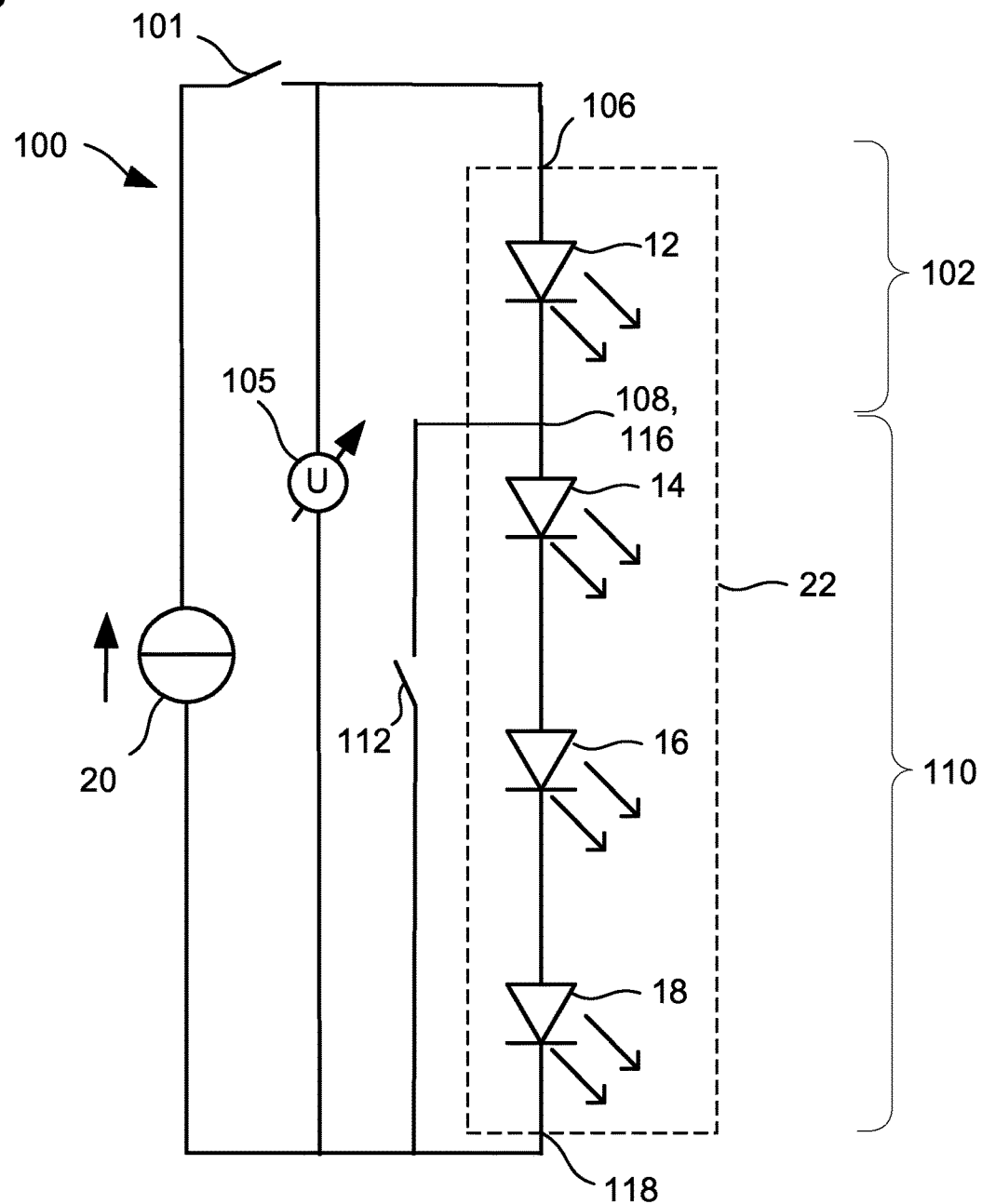
FIG. 6 shows a circuit diagram of one embodiment of an optoelectronic assembly.

FIG. 6 shows a circuit diagram of one embodiment of an optoelectronic assembly 100, which for example can largely correspond to the optoelectronic assembly 100 shown in FIG. 5. The optoelectronic assembly 100 includes the component string 22, wherein the component string 22 includes the section 102, which is designated as first section 102 in this context, and a second section 110. The first section 102 includes the input 106 and the output 108, which are designated as first input 106 and as first output 108, respectively, in this context. The second section 110 includes a second input 116 and a second output 118. The first output 108 can correspond to the second input 116 or can be directly electrically coupled to the latter.

A second switch 112 is electrically connected in parallel with the second section 110. The second switch 112 is electrically coupled firstly to the first output 108 and/or the second input 116 and secondly to the second output 118, the voltage measuring device 105 and the driver circuit 20. The second switch 112 in its first switching state electrically couples the first output 108 to the second output 118. In other words, in the first switching state of the second switch 112, the current is diverted around the second section 110, such that only the first section 102 is supplied with energy. The second switch 112 is connected for example between the cathode of the component string or ground (GND) and a node between the first and second light emitting diode elements 12, 14 and, in the closed state, bridges all the light emitting diode elements 14, 16, 18, apart from the—in FIG. 6—topmost, in particular first, light emitting diode element 12 of the component string 22. A cost-effective N-MOSFET or NPN transistor can be used for the second switch 112.

If the second switch 112 is in its first switching state, the function of the optoelectronic assembly 100 shown in FIG. 6 corresponds to the optoelectronic assembly 100 shown in FIG. 4, wherein the first light emitting diode element 12 can be examined with regard to the short circuit in accordance with the optoelectronic assembly 100 shown in FIG. 4. In particular, at the beginning of examining with regard to the short circuit, firstly the second switch 112 can be closed and then the first switch 101 can be closed and the first section 102 can be supplied with energy, or firstly the first switch 101 can be closed and the entire component string 22 can be supplied with energy and then the second switch 112 can be closed. Afterward, the supply of the component string 22, in particular of the first section 102, with energy is interrupted and the total voltage across the first section 102 is then detected by means of the voltage measuring device 105.

If it is identified that no short circuit is present in the case of the first light emitting diode element 12, then the detected total voltage can be designated as first total voltage and can be stored and/or predefined as a partial setpoint value for further measuring methods. The predefined setpoint value can then be determined depending on the partial setpoint value. In particular, the setpoint value can be predefined as a product of the partial setpoint value and the number n of light emitting diode elements 12, 14, 16, 18 in the section 102, 110 and/or component string to be examined. As an alternative thereto, the detected first total voltage can be predefined as a setpoint value and the total voltages subsequently detected are then divided by the number n of light emitting diode elements 12, 14, 16, 18 in the corresponding component string 22 or section 102, 110 before they are compared with the setpoint value predefined in this way.

If the second switch 112 is in its second switching state, that is to say is open, then the functioning of the optoelectronic assembly 100 shown in FIG. 6 corresponds to the optoelectronic assembly 100 shown in FIG. 5. In contrast thereto, however, now when examining the second section 110 with regard to the short circuit of one of the light emitting diode elements 12, 14, 16, 18, the setpoint value predefined previously as a reference and a comparison value can be used, which was determined depending on the partial setpoint value determined in the first section 102. In particular, with the second switch 112 open, the first switch 101 can be closed and the component string 22 can be supplied with energy. Afterward, the supply with energy is interrupted and a second total voltage present across the entire component string 22 is then detected by means of the voltage measuring device 105. The second total voltage can then be compared with the predefined setpoint value, in particular the product of the number n of light emitting diode elements 12, 14, 16, 18 in the component string. The predefined setpoint value in this embodiment corresponds, in particular, to four times the first total voltage. If the second total voltage is equal or at least approximately equal to the predefined setpoint value, then the second, third and fourth light emitting diode elements 14, 16, 18 have no short circuit. If the second total voltage is not equal or not at least approximately equal to the predefined setpoint value, in particular is less than the predefined setpoint value, then the second, the third and/or the fourth light emitting diode element 14, 16, 18 have/has the short circuit (the first light emitting diode element 12 has already been examined and assessed as entirely satisfactory).

Determining the first total voltage and predefining the setpoint value depending on the first total voltage if the first light emitting diode element 12 has no short circuit can be particularly advantageous if the second, third and fourth light emitting diode elements 14, 16, 18 are structurally identical to the first light emitting diode element 12 and are thus subject to the same aging, wear or temperature states as the first light emitting diode element 12. The influences of age, wear and/or temperature have then already affected the predefined setpoint value and thus already been taken into account and can thus be completely or at least partly eliminated. The examinations of the first light emitting diode element 12 and of the other light emitting diode elements 14, 16, 18 with regard to the short circuit should be carried out in rapid succession, for example successively within a maximum of a few seconds, in order that the temperature of the light emitting diode elements 12, 14, 16, 18 cannot change to an excessively great extent and corrupt the examination.

Since the threshold voltage is determined with the aid of the first light emitting diode element 12 and is then predefined as a setpoint value, it is not necessary to have to preprogram or predefine a good/bad threshold in the form of a setpoint value for the discharge current already in the production process and thus to design the optoelectronic assembly 100 for a specific type of light emitting diode elements 12, 14, 16, 18. In contrast thereto, a wide variety of types of light emitting diode elements 12, 14, 16, 18 can be arranged in the component string 22, as long as all the light emitting diode elements 12, 14, 16, 18 in the same component string 22 are of the same type. The checking with regard to the short circuit is thus independent of the type of light emitting diode elements 12, 14, 16, 18, in particular independent of the OLED type used. Furthermore, temperature and aging influences are minimized, with only one switch more, in particular the second switch 112, being additionally necessary. The second switch 112 can for example include a transistor or be formed by the latter. Furthermore, a simple and cost-effective driving of the second switch 112 is possible, since the control signal for the corresponding MOSFET can be related to ground.

Alternatively, the second switch 112 can also be connected between the input of the first section 102 and between the third and fourth light emitting diode elements 16, 18. The second switch 112 in the closed state then bridges the first, second and third light emitting diode elements 12, 14, 16, such that the last light emitting diode element of the component string 22, in particular the fourth light emitting diode element 18, can be operated and checked independently of the other light emitting diode elements.

Figure 7:
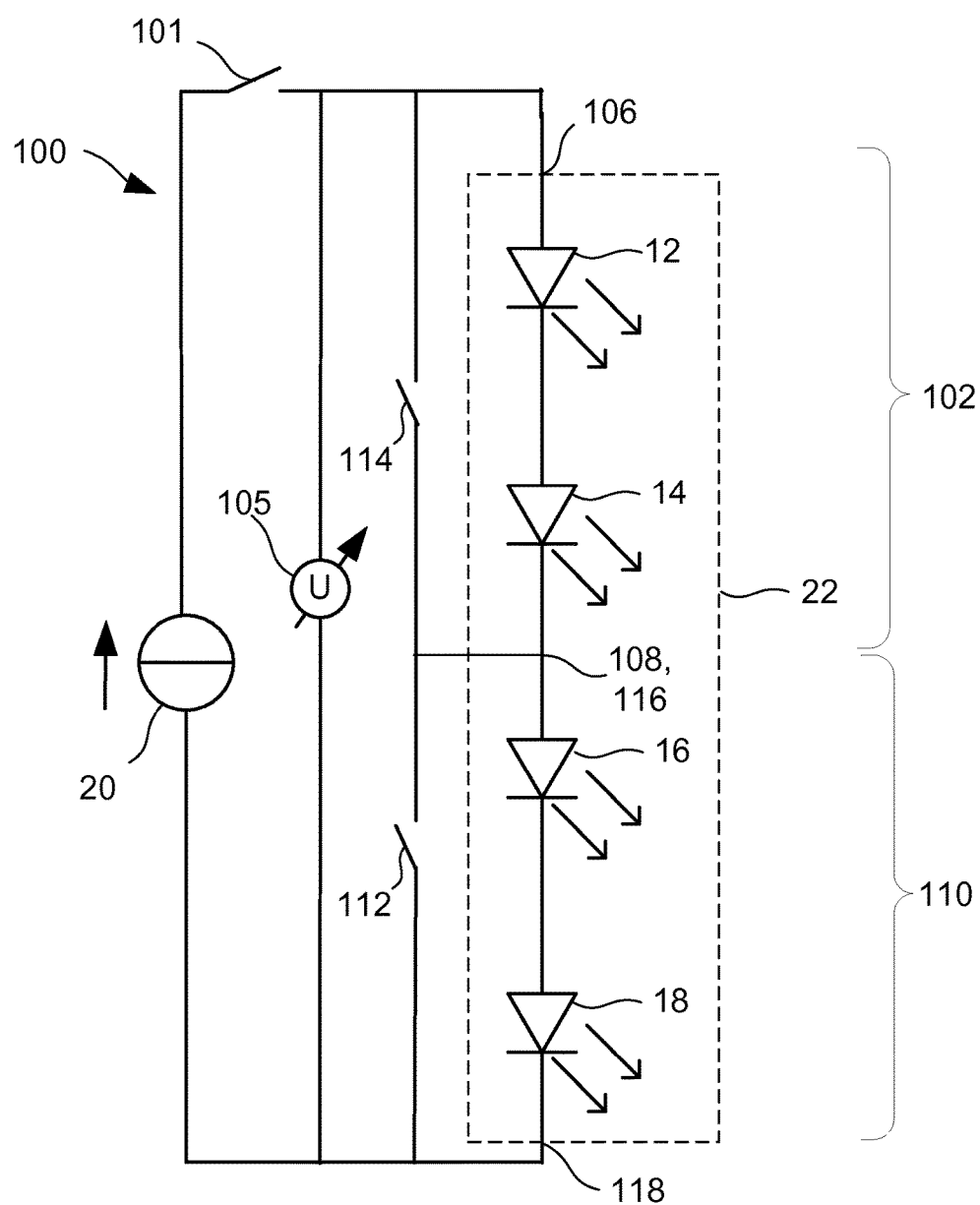
FIG. 7 shows a circuit diagram of one embodiment of an optoelectronic assembly.

FIG. 7 shows a circuit diagram of one embodiment of an optoelectronic assembly 100, which can be embodied for example in a manner largely corresponding to the optoelectronic assembly 100 shown in FIG. 6. The first section 102 includes at least the first and second light emitting diode elements 12, 14. The second section 110 includes at least the third and fourth light emitting diode elements 16, 18. The first output 108 and the second input 116 are arranged between the second light emitting diode element 14 and the third light emitting diode element 16. The second switch 112 is electrically coupled firstly to the first output 108 and/or the second input 116 and secondly to the second output 108. The second switch 112 is electrically connected in parallel with the second section 110. The second switch 112 in its first switching state electrically couples the first output 108 and the second output 118 directly to one another.

The assembly 100 includes a third switch 114. The third switch 114 is electrically coupled firstly to the first input 106 and secondly to the first output 108 and/or the second input 116. The third switch 114 is electrically connected in parallel with the first section 102. The third switch 114 in its first switching state electrically couples the first input 106 and the second input 108 directly to one another.

Consequently, with the second switch 112 closed and the third switch 114 open, only the first section 102 can be supplied with electrical energy and, with the third switch 114 closed and the second switch 112 open, only the second section 110 can be supplied with electrical energy.

When one of the sections 102, 110 is supplied with electrical energy, the intrinsic capacitances of the light emitting diode elements 12, 14, 16, 18 are charged and, when the energy supply is interrupted, discharge to the threshold voltages of the individual light emitting diode elements 12, 14, 16, 18, such that the corresponding total voltage consisting of the sum of the individual threshold voltages is established across the corresponding section 102, 110. This total voltage can then be detected section-individually by means of the voltage measuring device 105. Depending on the detected total voltage, in accordance with the methods explained above, for each of the sections 102, 110 individually it is possible to examine whether or not the corresponding section 102, 110 has a light emitting diode element 12, 14, 16, 18 having a short circuit. The examination with regard to the short circuit can be carried out in a manner substantially corresponding to the examinations explained above. Alternatively or additionally, the detected total voltages can be compared with one another, as a result of which a relative and/or redundant checking of the presence of a short circuit is possible. In principle, when detecting the total voltage, the signature of the short circuit is all the more pronounced, the shorter the examined component string 22 or section 102, 110.

In the case of the optoelectronic assembly 100 shown in FIG. 7, the component string 22 is halved by means of the sections 102, 110 and the second and third switches 112, 114 and the signature of a short circuit in the component string 22 becomes clearer, compared with the signature in the case of the same number of light emitting diode elements 12, 14, 16, 18 and only a single section 102. In return, it is necessary to carry out two checks instead of one and the detected total voltages have to be checked individually depending on the predefined setpoint value. Optionally, even further switches can be added, for example if the component string 22 includes even further light emitting diode elements 12, 14, 16, 18.

As an alternative thereto, one of the two switches 112, 114 can be dispensed with, in which case only one of the two sections 102, 110 can then be checked independently of the corresponding other section 102, 110.

Figure 8:
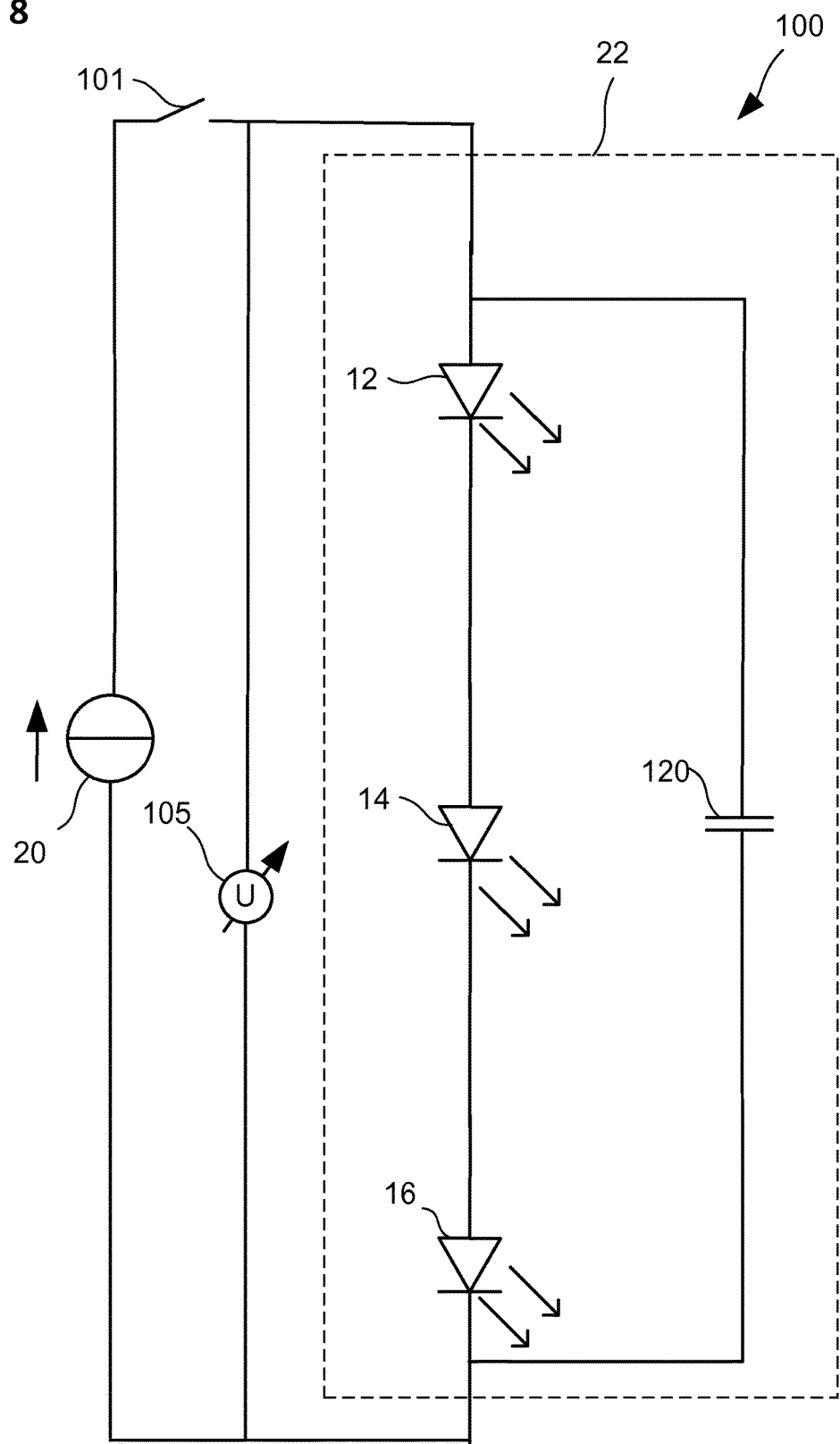
FIG. 8 shows a circuit diagram of one embodiment of an optoelectronic assembly.

FIG. 8 shows a circuit diagram of one embodiment of an optoelectronic assembly 100, which can largely correspond for example to the optoelectronic assembly 100 shown in FIG. 5. The optoelectronic assembly 100 includes inorganic light emitting diode elements 12, 14, 16. The inorganic light emitting diode elements 12, 14, 16, compared with organic light emitting diode elements, have relatively small electrodes and the electrode capacitances are relatively low. Therefore, in the case of this optoelectronic assembly 100, a capacitor 120 is electrically connected in parallel with the light emitting diode elements 12 in such a way that an electronic behavior of the component string 22 having the inorganic light emitting diode elements 12, 14, 16 is at least similar to the electronic behavior of a corresponding component string having organic light emitting diode elements. The capacitor 120 supports the intrinsic capacitances of the light emitting diode elements 12, 14, 16, 18.

When the component string 22 is supplied with electrical energy, the capacitor 120 is charged. After the energy supply of the component string 22 has been interrupted, the component string 22 discharges apart from the energy stored in the capacitor 120. In particular, the capacitor voltage present at the capacitor 120 corresponds to the total voltage of all the intact light emitting diode elements 12, 14, 16 in the component string 22. If one of the light emitting diode elements 12, 14, 16 has a short circuit, then the capacitor voltage and the total voltage decrease by the corresponding individual or threshold voltage. Consequently, the above-explained method for operating the optoelectronic assembly 100, in particular for determining the short circuit at one of the light emitting diode elements 12, 14, 16, 18, can readily be applied to the optoelectronic assembly 100 including the inorganic light emitting diode elements 12, 14, 16.

As an alternative or in addition to the capacitor 120, a respective capacitor can be electrically connected in parallel with each individual light emitting diode element 12, 14, 16.

The capacitor 120 can also be arranged if the optoelectronic assembly 100 includes exclusively organic light emitting diode elements 12, 14, 16, 18.

Figures 9, 10:
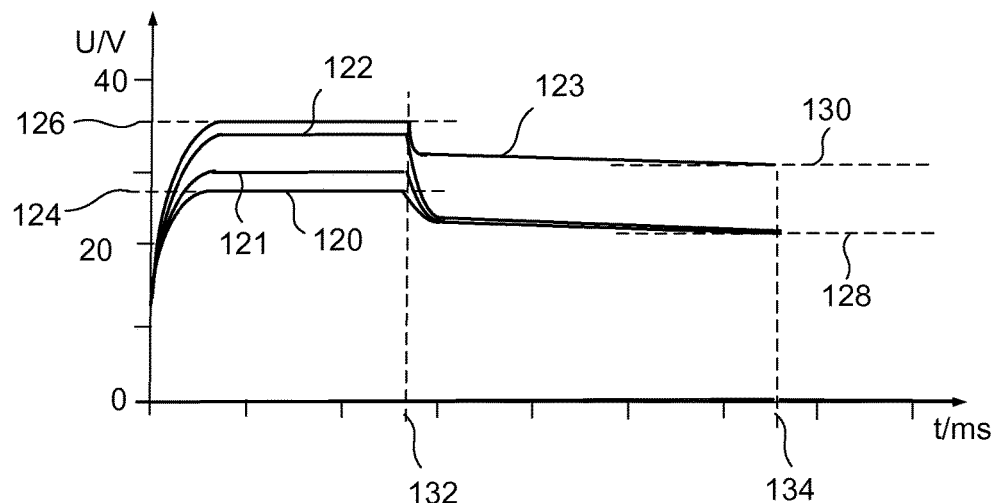
FIG. 9 shows a diagram with exemplary profiles of voltages and currents.
FIG. 10 shows a table with exemplary measurement results.

FIG. 9 shows diagrams with exemplary profiles of voltages and a current. In particular, the upper diagram in FIG. 9 shows a first voltage profile 120, a second voltage profile 121, a third voltage profile 122 and a fourth voltage profile 123. The second and third voltage profiles 121, 122 lie between the first and fourth voltage profiles 121, 123.

At the instant t=0, the component string 22 is supplied with energy and the first voltage profile 120 rises to a first voltage value 124 and the fourth voltage profile 123 rises to a second voltage value 126. The voltage values 124, 126 and the voltage values therebetween of the voltage profiles 120, 121, 122, 123 depend on whether a short circuit is present and, if so, what resistance this short circuit has. In particular, a short circuit is present in the case of the first, second and third voltage profiles 120, 121, 122 and no short circuit is present in the case of the fourth voltage profile 122. During the supplying of the component string 22 with energy, the voltage profiles 120, 121, 122, 123 are so different that they are not suitable for reliably identifying the short circuit. By way of example, during the supplying of the component string 22 with energy, the third and fourth voltage profiles 122, 123 are very similar even though a short circuit is present in one situation and is not present in the other.

At a first instant 132, the supply of the component string 22 with energy is interrupted, such that the total voltage drops to the sum of the threshold voltages of the intact light emitting diode elements 12, 14, 16, 18, specifically independently of the resistance of the short circuit. In particular, the first, second and third voltage profiles 120, 121, 122 drop to a third voltage value 128 and the fourth voltage profile 123 drops only to a fourth voltage value 130. The fourth voltage value 130 corresponds to the total voltage of all the light emitting diode elements 12, 14, 16, 18 since no short circuit is present. The third voltage value 128 corresponds to the sum of all the intact light emitting diode elements 12, 14, 16, 18 since a short circuit is present at one of the light emitting diode elements 12, 14, 16, 18. The third voltage value 128 differs significantly from the fourth voltage value 130 and the third voltage value 128 is equal or at least approximately equal in the first, second and third voltage profiles 120, 121, 122, such that the presence of the short circuit is identifiable simply and reliably.

FIG. 10 shows an exemplary table of measured values. The first column of the table indicates the number n of light emitting diode elements 12, 14, 16, 18 in the section 102, 110 to be checked. The second column indicates a voltage U detected during the supplying of the component string 22 with energy if no short circuit is present in the corresponding section 102, 110. The third column indicates the detected total voltage Uges across the corresponding section 102, 110 after the interrupting of the supplying of the component string 22 with energy if no short circuit is present. The fourth column indicates the average individual voltage Uges/n at the light emitting diode elements 12, 14, 16, 18 if no short circuit is present. The fifth column indicates the voltage U detected during the supplying of the component string 22 with energy if in each case one of the light emitting diode elements 12, 14, 16, 18 has a short circuit. The sixth column indicates the detected total voltage Uges across the corresponding section 102, 110 after the interrupting of the supplying of the component string 22 with energy if one of the light emitting diode elements 12, 14, 16, 18 has the short circuit. The seventh column indicates the average individual voltage Uges/(n−1) across each intact one of the light emitting diode elements 12, 14, 16, 18 if one of the light emitting diode elements 12, 14, 16, 18 has the short circuit. The eighth column indicates a first percentage deviation VGL1 of the total voltage Uges after the interrupting of the supplying of the component string 22 with energy given the presence of a short circuit relative to the total voltage Uges after the interrupting of the supplying of the component string 22 with energy given exclusively entirely satisfactory light emitting diode elements 12, 14, 16, 18. The ninth column indicates a second percentage deviation VGL2 of the voltage U during the supplying of the component string 22 with energy given the presence of a short circuit relative to the voltage U during the supplying of the component string 22 with energy given exclusively entirely satisfactory light emitting diode elements 12, 14, 16, 18.

It is generally evident from FIG. 10 that the short circuit can be identified simply and reliably by means of the above-explained method for operating the assembly 100 and/or by means of the assemblies 100 illustrated above. In particular the comparison of the percentage deviations VGL1 and VGL2 reveals that detecting the total voltage Uges after the interrupting of the supplying of the component string 22 with energy enables a better identification accuracy and thus more reliable identification of a short circuit in the component string 22 than measuring the voltage U, in particular the forward voltage during the normal operation of the component string 22. This better identification is afforded in particular for any desired string length of the component string 22.

The diagrams and the table confirm the functioning of the methods described above. The voltages U represented by the voltage profiles 120, 122, 121 during the normal operation of the optoelectronic assembly 100 can vary greatly depending on the type, size and/or resistance value of the short circuit and are therefore not always suitable, or are suitable only in a limited way, for identifying the short circuit. The total voltage Uges a short time after the interrupting of the supply of the component string 22 with energy corresponds in principle, taking account of acceptable tolerances, to the sum of the threshold voltages of the intact light emitting diode elements 12, 14, 16, 18 and is therefore very well suited to identifying the short circuit. In the case of a short-circuited light emitting diode element 12, 14, 16, 18, the total voltage Uges decreases by one threshold voltage compared with a component string including exclusively entirely satisfactory light emitting diode elements 12, 14, 16, 18. In the case of two or more short-circuited light emitting diode elements 12, 14, 16, 18, the total voltage Uges decreases by correspondingly two or more threshold voltages compared with a component string including exclusively entirely satisfactory light emitting diode elements 12, 14, 16, 18.

Figure 11:
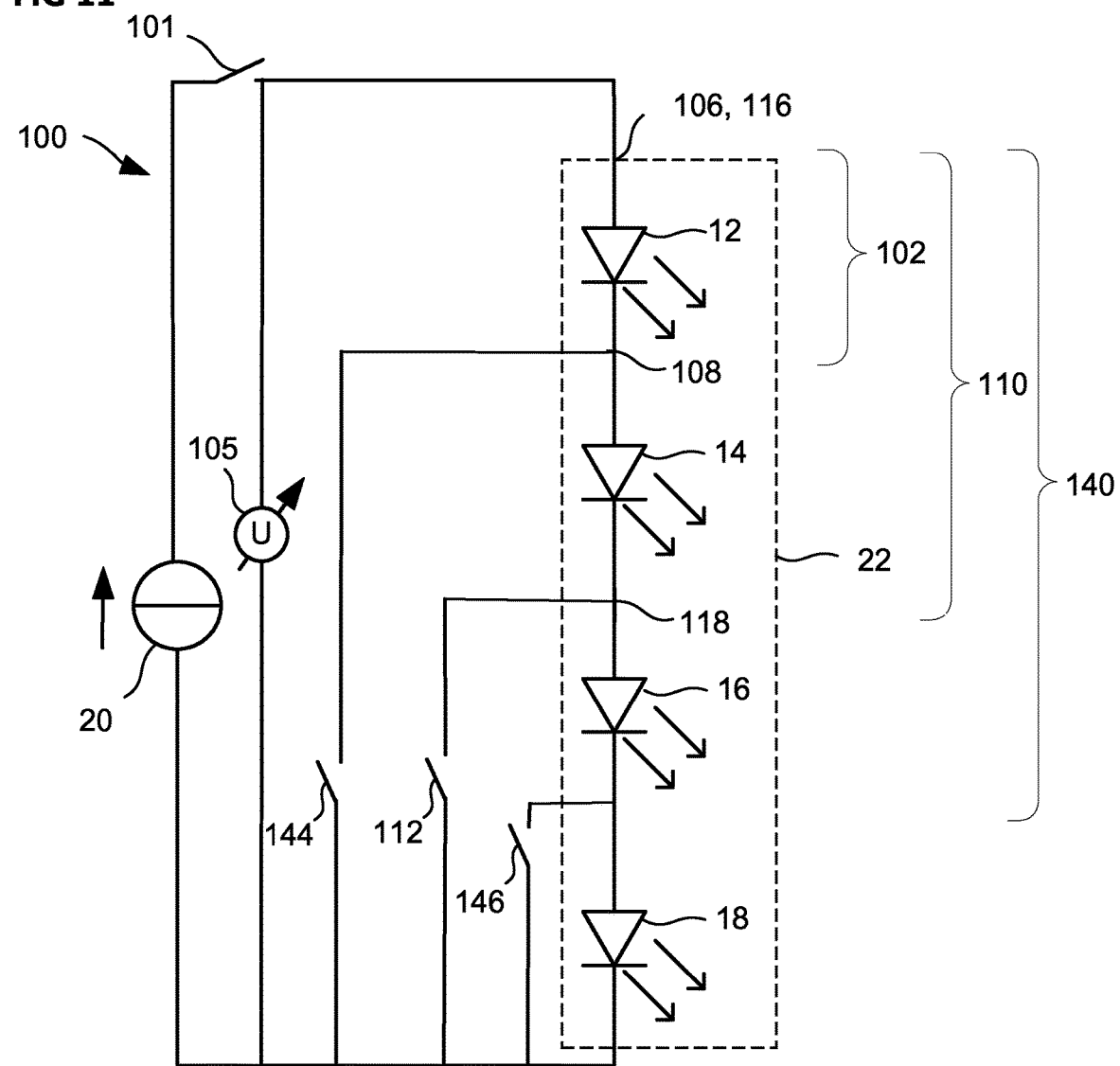
FIG. 11 shows a circuit diagram of one embodiment of an optoelectronic assembly.

FIG. 11 shows a circuit diagram of one embodiment of an optoelectronic assembly 100, which can be embodied for example in a manner largely corresponding to the optoelectronic assembly 100 shown in FIG. 6. The first section 102 includes at least the first light emitting diode element 12. The second section 110 includes at least the first and second light emitting diode elements 12, 14. A third section 140 includes at least the first, second and third light emitting diode elements 12, 14, 16. The first input 106 and the second input 116 correspond to one another. The first output 108 is arranged between the first and second light emitting diode elements 12, 14. The second output 118 is arranged between the second and third light emitting diode elements 14, 16. A third input of the third section 140 corresponds to the first and second inputs 106, 116. An output of the third section 140 is arranged between the third and fourth light emitting diode elements 16, 18. A fourth section includes all the light emitting diode elements 12, 14, 16, 18 of the component string 22. An input of the fourth section corresponds to the first and second inputs 106, 116.

The second switch 112 is electrically coupled firstly to the second output 118 and secondly to the driver circuit 20 and/or the voltage measuring device 105. The second switch 112 in its first switching state bridges the third and fourth light emitting diode elements 16, 18. A fourth switch 144 is electrically coupled firstly to the first output 108 and secondly to the driver circuit 20 and/or the voltage measuring device 105. The fourth switch 144 in its first switching state bridges the second, third and fourth light emitting diode elements 14, 16, 18. A fifth switch 146 is electrically coupled firstly to the third output of the third section 140 and secondly to the driver circuit 20 and/or the voltage measuring device 105. The fifth switch 146 in its first switching state bridges the fourth light emitting diode element 18.

Consequently, with the fourth switch 144 closed, only the first section 102 can be supplied with electrical energy. Moreover, with the fourth switch 144 open and the second switch 112 closed, the second section 110 can be supplied with electrical energy. Moreover, with the fourth switch 144 open, the second switch 112 open and the fifth switch 146 closed, the third section 140 can be supplied with electrical energy. If the second, fourth and fifth switches 112, 144, 146 are open and are thus in each case in their second switching state, then the entire component string 22 can be supplied with energy.

When one of the sections 102, 110, 140 or the entire component string 22 is supplied with electrical energy, the intrinsic capacitances of the corresponding light emitting diode elements 12, 14, 16, 18 are charged. After the energy supply has been interrupted, the intrinsic capacitances discharge, provided that no short circuit is present, only to the threshold voltages of the corresponding individual light emitting diode elements 12, 14, 16, 18, such that the corresponding total voltage Uges consisting of the sum of the individual threshold voltages of the intact light emitting diode elements 12, 14, 16, 18 is established across the corresponding section 102, 110, 140. Said total voltage Uges can then be detected section-individually by means of the voltage measuring device 105 after the energy supply has been interrupted. Depending on the detected total voltage Uges, in accordance with the methods explained above, for each of the sections 102, 110, 140 it is possible to individually examine whether or not the corresponding section 102, 110, 140 includes a light emitting diode element 12, 14, 16 having a short circuit. The examination with regard to the short circuit can be carried out in a manner substantially corresponding to the examinations explained above. Alternatively or additionally, the detected total voltages Uges can be compared with one another taking account of the different numbers of light emitting diode elements 12, 14, 16, 18 in the sections 102, 110, 140, as a result of which a relative and/or redundant checking of the presence of a short circuit is possible. In principle, when detecting the total voltage Uges, the signature of the short circuit is all the more pronounced, the shorter the examined component string 22 or section 102, 110, 140.

In the case of the optoelectronic assembly 100 shown in FIG. 11, each of the switches 112, 144, 146 can be a transistor, for example a MOSFET, which is directly connected to ground. As a result, a simple and cost-effective driving of the corresponding switch 112, 144, 146 is possible, since the control signal for the corresponding MOSFET can be related to ground.

In the embodiment shown in FIG. 11, there is only ever one light emitting diode element 12, 14, 16, 18 arranged between two terminals of the switches 112, 144, 146. As an alternative thereto, however, it is also possible for two or more light emitting diode elements 12, 14, 16, 18 to be arranged between two terminals of the switches 112, 144, 146. Furthermore, the fourth switch 144 or the fifth switch 146 can be dispensed with or even further switches can be arranged such that they define new sections and are in each case directly connected to ground.

FIG. 12 shows a circuit diagram of one embodiment of an optoelectronic assembly 100, which can be embodied for example in a manner largely corresponding to the optoelectronic assembly 100 shown in FIG. 11. The first section 102 includes all the light emitting diode elements 12, 14, 16, 18. The second section 110 includes at least the second, third and fourth light emitting diode elements 14, 16, 18. The third section 140 includes at least the third and fourth light emitting diode elements 16, 18. The fourth section includes at least the fourth light emitting diode element 18.

The first output 108 and the second output 118 correspond to one another. The second input 116 is formed between the first and second light emitting diode elements 12, 14. The third input of the third section 140 is arranged between the second and third light emitting diode elements 14, 16. The third output of the third section 140 corresponds to the first and second outputs 108, 118. The input of the fourth section is arranged between the third and fourth light emitting diode elements 16, 18. An output of the fourth section corresponds to the output of the first, second and third sections 102, 110, 140.

A second voltage detection device 152 is electrically coupled firstly to the second output 118 and secondly to the driver circuit 20 and/or the voltage measuring device 105, which in this context is designated as first voltage measuring device 105. The second voltage measuring device 150 detects the total voltage across the third and fourth light emitting diode elements 16, 18. A third voltage measuring device 152 is electrically coupled firstly to the second input 116 and secondly to the driver circuit 20 and/or the first voltage measuring device 105. The third voltage measuring device 152 detects the total voltage across the second, third and fourth light emitting diode elements 14, 16, 18. A fourth voltage measuring device 154 is electrically coupled firstly to the input of the fourth section and secondly to the driver circuit 20 and/or the first voltage measuring device 105. The fourth voltage measuring device 154 detects the total voltage across the fourth light emitting diode element 18.

When one of the sections 102, 110, 140 or the entire component string 22 is supplied with electrical energy, the intrinsic capacitances of the corresponding light emitting diode elements 12, 14, 16, 18 are charged. After the energy supply has been interrupted, the intrinsic capacitances discharge, provided that no short circuit is present, only to the threshold voltages of the corresponding individual light emitting diode elements 12, 14, 16, 18, such that the corresponding total voltage Uges consisting of the sum of the individual threshold voltages of the intact light emitting diode elements 12, 14, 16, 18 is established across the corresponding section 102, 110, 140. After the energy supply of the component string 22 has been interrupted, said total voltage Uges can then be detected section-individually by means of the corresponding voltage measuring devices 105, 150, 152, 154. Depending on the detected total voltage Uges, in accordance with the methods explained above, for each of the sections 102, 110, 140 it is possible to individually examine whether or not the corresponding section 102, 110, 140 includes a light emitting diode element 12, 14, 16 having a short circuit. The examination with regard to the short circuit can be carried out in a manner substantially corresponding to the examinations explained above. Alternatively or additionally, the detected total voltages Uges can be compared with one another taking account of the different numbers of light emitting diode elements 12, 14, 16, 18 in the sections 102, 110, 140, as a result of which a relative and/or redundant checking of the presence of a short circuit is possible. By way of example, the total voltage detected by means of the third voltage measuring device 152 can be subtracted from the total voltage Uges detected by means of the first voltage measuring device 105, wherein the difference corresponds to the individual voltage across the first light emitting diode element 12. If the first light emitting diode element 12 has no short circuit, then the individual voltage thus determined can be taken as a basis as a reference value for checking the other sections, wherein the number of light emitting diode elements 12, 14, 16, 18 in the corresponding section has to be taken into account. Alternatively or additionally, the individual voltages of the other light emitting diode elements 12, 14, 16, 18 can be determined by means of further corresponding difference formations in respect of the detected voltages. By way of example, the individual voltage of the third light emitting diode element 16 can be determined by the voltage detected by means of the fourth voltage measuring device 154 being subtracted from the voltage detected by means of the second voltage measuring device 150. In principle, when detecting the total voltage Uges, the signature of the short circuit is all the more pronounced, the shorter the examined component string 22 or section 102, 110, 140.

The second, fourth and fifth switches 112, 144, 146 can be dispensed with in the case of the optoelectronic assembly 100 shown in FIG. 12. A simple and cost-effective checking of the component string 22 can be realized as a result.

In the embodiment shown in FIG. 12, there is only ever one light emitting diode element 12, 14, 16, 18 arranged between two terminals of the voltage measuring devices 105, 150, 152, 154. As an alternative thereto, however, it is also possible for two or more light emitting diode elements 12, 14, 16, 18 to be arranged between two terminals of the voltage measuring devices 105, 150, 152, 154. Furthermore, one or two of the voltage measuring devices 105, 150, 152, 154 can be dispensed with or even further voltage measuring devices can be arranged such that they define new sections.

In various embodiments, the optoelectronic assembly 100 includes: at least one component string 22 having at least one section 102, 110, wherein the section 102, 110 includes at least one light emitting diode element 12, 14, 16, 18, a driver circuit 20 electrically coupled to the component string 22 and serving for supplying the component string 22 with electrical energy, a first switch 101 for interrupting the supply of the component string 22 with energy, a voltage measuring device 105 for detecting a total voltage between an input 106, 116 of the section 102, 110 of the component string 22 and an output 108, 118 of the section 102, 110 of the component string 22, and an evaluation unit, which is configured to determine, depending on the detected total voltage Uges, whether the section 102, 110 of the component string 22 has a short circuit.

The present disclosure is not restricted to the embodiments indicated. By way of example, the component strings 22 shown can in each case include more or fewer light emitting diode elements 12, 14, 16, 18 and/or more or fewer sections 102, 110, 140 and correspondingly more or fewer switches 112, 114, 144, 146. Furthermore, the optoelectronic assembly 100 may include one, two or more further component strings 22. Furthermore, the embodiments can be combined with one another. By way of example, in all the embodiments, inorganic light emitting diode elements 12, 14, 16, 18 can be used, for example with the corresponding capacitors 44, 50, 56 and resistances 42, 48, 54. Furthermore, it is also possible to correspondingly identify a plurality of short circuits in one light emitting diode element 12, 14, 16, 18 and/or in correspondingly a plurality of light emitting diode elements 12, 14, 16, 18. By way of example, if two or more light emitting diode elements 12, 14, 16, 18 each having a short circuit are present, then the total voltage is lower by the corresponding individual voltages compared with the case of an entirely satisfactory component string 22 without short-circuited light emitting diode elements 12, 14, 16, 18.

Furthermore, in all the embodiments and/or embodiments, it holds true, in principle, that an input of the component string 22 can correspond to an input of the first section 102 and/or a first electrode of the first light emitting diode element 12 and that an output of the component string 22 can correspond to an output of the last section, for example to the output of the second section 110 and/or a second electrode of the last light emitting diode element of the component string 22, for example of the fourth light emitting diode element 18. Furthermore, in principle, a second electrode of one of the light emitting diode elements 12, 14, 16 can correspond to the first electrode of the succeeding light emitting diode element 14, 16, 18. If the component string 22 includes a plurality of sections 102, 110, then in principle an output of one section 102 can correspond to a second electrode of the last light emitting diode element 12, 14 in the corresponding section 102 and/or to an input of the succeeding section 110 and/or to a first electrode of the first light emitting diode element 16, 18 in the succeeding section 110. If only one section 102 is implemented, then this can correspond to the component string 22 and/or be designated as the component string 22. If a section 102 and/or a component string 22 include(s) only one light emitting diode element 12, then the light emitting diode element 12 in principle is representative of the section 102 and/or the component string 22.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for operating an optoelectronic assembly, comprising at least one component string having at least one section, wherein the section comprises at least one light emitting diode element, the method comprising:
   supplying the component string with electrical energy,
   interrupting the supply of the component string with electrical energy,
   detecting a total voltage (Uges), which is present between an input of the section of the component string and an output of the section of the component string, and
   comparing the total voltage (Uges) with a sum of threshold voltages (Uf) of all the light emitting diode elements of the section,
   it is identified that the section of the component string has no short circuit if the total voltage (Uges) is equal or at least approximately equal to the sum of the threshold voltages (Uf), and/or
   it is identified that the section of the component string has a short circuit if the total voltage (Uges) is less than the sum of the threshold voltages (Uf).

2. The method as claimed in claim 1, wherein
   the section comprises a predefined number (n) of light emitting diode elements,
   all the light emitting diode elements of the section have the same threshold voltage (Uf),
   it is identified that the section has the short circuit if the detected total voltage (Uges) is less than the sum of all the threshold voltages (Uf) by one threshold voltage (Uf).

3. The method as claimed in claim 1, wherein the total voltage (Uges) is detected only after a predefined time duration after the interrupting of the supplying of the component string with electrical energy.

4. The method as claimed in claim 3, further comprising: determining after what time duration after the interrupting of the supplying of the component string with energy a voltage across a light emitting diode element of the section of the component string corresponds to its threshold voltage (Uf), and wherein the determined time duration is predefined as the predefined time duration.

5. The method as claimed in claim 1, wherein the supply of the component string with energy is interrupted by a driver circuit for operating the component string being switched off or an electrical connection between the driver circuit and the component string being interrupted.

6. The method as claimed in claim 1, wherein
firstly it is determined whether a first section of the component string that comprises a first light emitting diode element has a short circuit by virtue of the fact that, after interrupting the supplying of the component string with energy, an individual voltage is detected at the first light emitting diode element and the detected individual voltage is compared with the threshold voltage (Uf) of the first light emitting diode element,
if the detected individual voltage is equal or at least approximately equal to the threshold voltage (Uf), the detected individual voltage is predefined as a setpoint value,
the first section of the component string and a second section of the component string, said second section being connected in series with the first section and comprising at least one second light emitting diode element, are supplied with energy,
the supply of the component string with energy is interrupted again,
the total voltage (Uges) between the input of the first section and an output of the second section is detected,
the detected total voltage (Uges) is compared with a product of the predefined setpoint value and the number of light emitting diode elements in the component string,
it is identified that the second section has a short circuit if the detected total voltage (Uges) is less than the product,
it is identified that the second section has no short circuit if the detected total voltage (Uges) is equal or at least approximately equal to the product.

7. The method as claimed in claim 1, wherein
firstly it is determined whether a first section of the component string that comprises at least one first light emitting diode element has a short circuit by virtue of the fact that, after interrupting the supplying of the component string with energy, a first total voltage (Uges) between an input of the first section of the component string and an output of the first section of the component string is detected, and the detected first total voltage is compared with a sum of the threshold voltages (Uf) of all the light emitting diode elements of the first section,
the first section of the component string and a second section of the component string, said second section being connected in series with the first section and comprising at least one second light emitting diode element, are supplied with energy,
the supply of the component string with energy is interrupted,
a second total voltage between an input of the second section and an output of the second section is detected, and the detected second total voltage is compared with a sum of the threshold voltages (Uf) of all the light emitting diode elements of the second section.

8. The method as claimed in claim 7, wherein the first total voltage is compared with the second total voltage, and wherein the presence of the short circuit in one of the sections is identified depending on the comparison.

9. An optoelectronic assembly, comprising:
at least one component string having at least one section, wherein the section comprises at least one light emitting diode element, a driver circuit electrically coupled to the component string and serving for supplying the component string with electrical energy,
a first switch for interrupting the supply of the component string with energy,
a voltage measuring device for detecting a total voltage between an input of the section of the component string and an output of the section of the component string after the supply of the component string with energy is interrupted, and
an evaluation unit, which is configured to determine, depending on the detected total voltage (Uges) whether the section of the component string has a short circuit by virtue of the fact that the total voltage (Uges) is compared with a sum of threshold voltages (Uf) of all the light emitting diode elements of the section and it is identified that the section of the component string has no short circuit if the total voltage (Uges) is equal or at least approximately equal to the sum of the threshold voltages (Uf), and/or it is identified that the section of the component string has a short circuit if the total voltage (Uges) is less than the sum of the threshold voltages (Uf).

10. The optoelectronic assembly as claimed in claim 9, wherein the first switch is designed such that the driver circuit can be switched on or switched off by means of the first switch or that an electrical connection between the driver circuit and the component string can be connected or interrupted.

11. The optoelectronic assembly as claimed in claim 9, wherein
the component string comprises a first section and a second section, which is electrically connected in series with the first section,
the first section comprises at least one first light emitting diode element,
the second section comprises at least one second light emitting diode element,
the optoelectronic assembly comprises a second switch, which in its first switching state electrically couples an output of the first section to an output of the second section and which in its second switching state electrically isolates the output of the first section and the output of the second section from one another.

12. The optoelectronic assembly as claimed in claim 11, further comprising a third switch, which in its first switching state electrically couples an input of the first section to an input of the second section and which in its second switching state electrically isolates the input of the first section and the input of the second section from one another and which is electrically coupled to the second switch.

13. The optoelectronic assembly as claimed in claim 9, wherein at least one of the light emitting diode elements is an inorganic light emitting diode and wherein a capacitor is electrically connected in parallel with the component string.

14. The optoelectronic assembly as claimed in claim 9, wherein at least two of the light emitting diode elements are inorganic light emitting diodes, and wherein a respective capacitor is electrically connected in parallel with the inorganic light emitting diodes.

15. The optoelectronic assembly as claimed in claim 9, wherein at least one section of the component string comprises at least two light emitting diode elements.

* * * * *